US008280132B2

(12) United States Patent
Madabhushi et al.

(10) Patent No.: US 8,280,132 B2
(45) Date of Patent: Oct. 2, 2012

(54) MALIGNANCY DIAGNOSIS USING CONTENT-BASED IMAGE RETREIVAL OF TISSUE HISTOPATHOLOGY

(75) Inventors: Anant Madabhushi, South Plainfield, NJ (US); Scott Doyle, Middletown, NJ (US); Michael D. Feldman, Garnet Valley, PA (US); John E. Tomaszewski, Abington, PA (US)

(73) Assignees: Rutgers, The State University of New Jersey, New Brunswick, NJ (US); The Trustees of the University of Pennsylvania, Philadelphia, PA (US)

(*) Notice: Subject to any disclaimer, the term of this patent is extended or adjusted under 35 U.S.C. 154(b) by 541 days.

(21) Appl. No.: 12/375,981

(22) PCT Filed: Aug. 1, 2007

(86) PCT No.: PCT/US2007/017181
§ 371 (c)(1),
(2), (4) Date: Dec. 15, 2009

(87) PCT Pub. No.: WO2009/017483
PCT Pub. Date: Feb. 5, 2009

(65) Prior Publication Data
US 2010/0098306 A1 Apr. 22, 2010

Related U.S. Application Data

(60) Provisional application No. 60/834,697, filed on Aug. 1, 2006.

(51) Int. Cl.
*G06K 9/00* (2006.01)

(52) U.S. Cl. .......... 382/128; 382/190; 382/224
(58) Field of Classification Search .......... 382/128, 382/190, 224; 600/410
See application file for complete search history.

(56) References Cited

U.S. PATENT DOCUMENTS 6,418,238 B1* 7/2002 Shiratani et al. ............ 382/133
2006/0064248 A1 3/2006 Saidi et al.

OTHER PUBLICATIONS

Hwang et al: "Classification of breast tissue images based on wavelet transform using discriminant analysis neural network and SVM", IEEE, 2005.*
Petushi et al: "Automated Identification of Microstructures on Histology Slides", IEEE, 2004.*
Haralick et al., "Textural Features for Image Classification"; Nov. 1973; pp. 610-621; vol. SMC—3, No. 6; IEEE Transactions on Systems, Man, and Cybernetics.
Jörnsten et al., Simultaneous Gene Clustering and Subset Selection for Sample Classification Via MDL; 2003; pp. 1100-1109; vol. 19, No. 9; Bioinformatics.

* cited by examiner

*Primary Examiner* — Matthew Bella
*Assistant Examiner* — Ruiping Li
(74) *Attorney, Agent, or Firm* — RatnerPrestia

(57) ABSTRACT

This invention relates to computer-aided diagnostics using content-based retrieval of histopathological image features. Specifically, the invention relates to the extraction of image features from a histopathological image based on predetermined criteria and their analysis for malignancy determination.

25 Claims, 11 Drawing Sheets

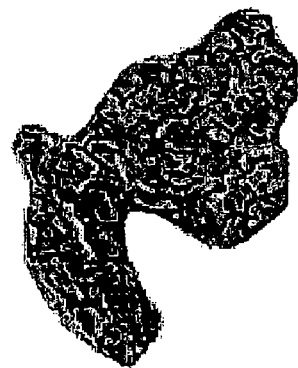
FIG. 3(d)
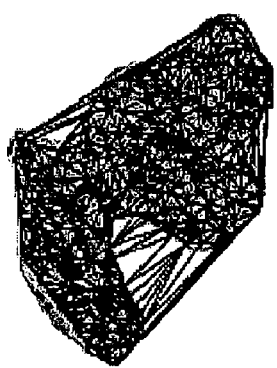
FIG. 3(c)
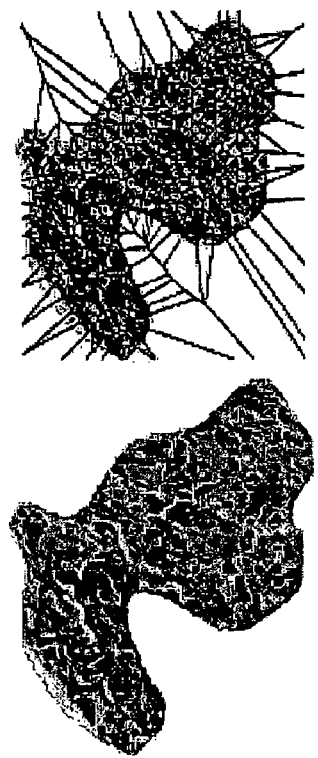
FIG. 3(b)
FIG. 3(a)
FIG. 4(b)
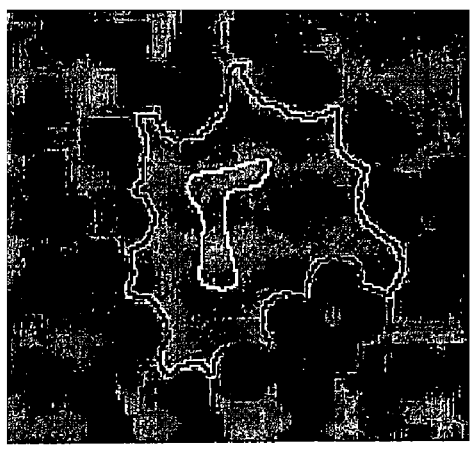
FIG. 4(a)

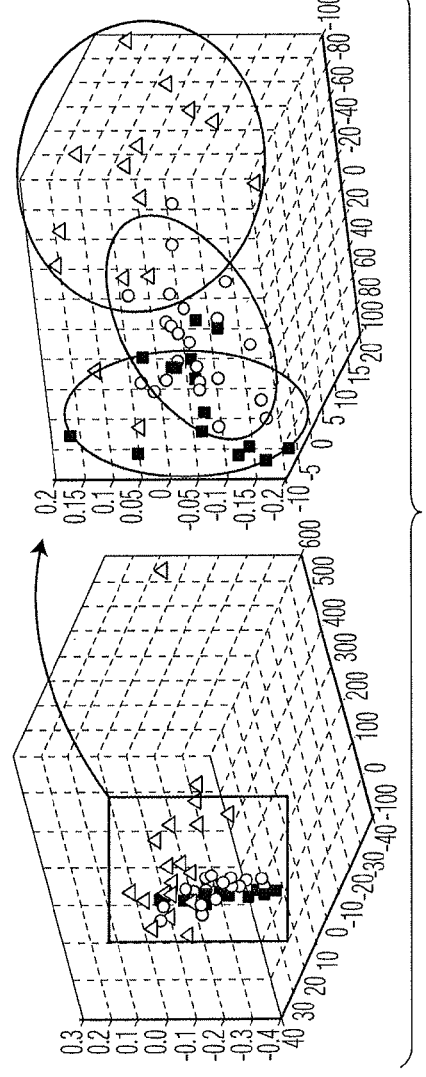
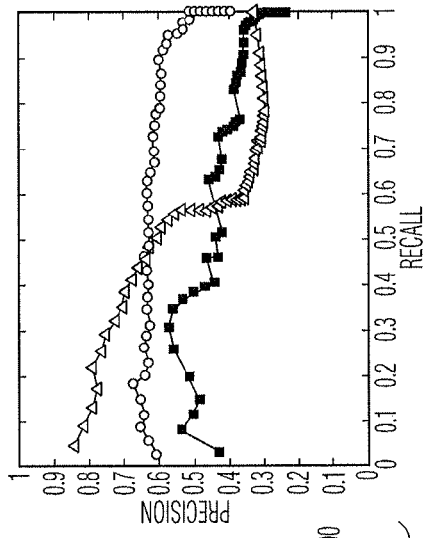
FIG. 5(a)
FIG. 5(b)
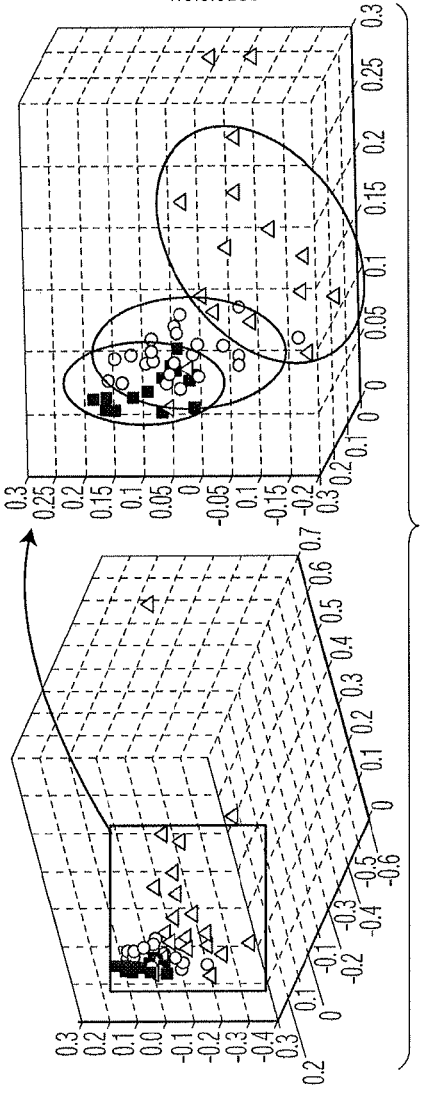
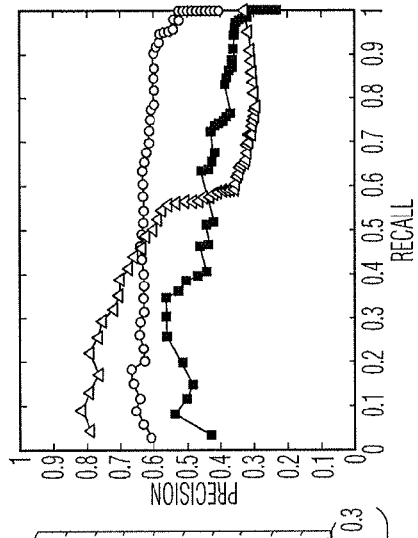
FIG. 5(c)
FIG. 5(d)

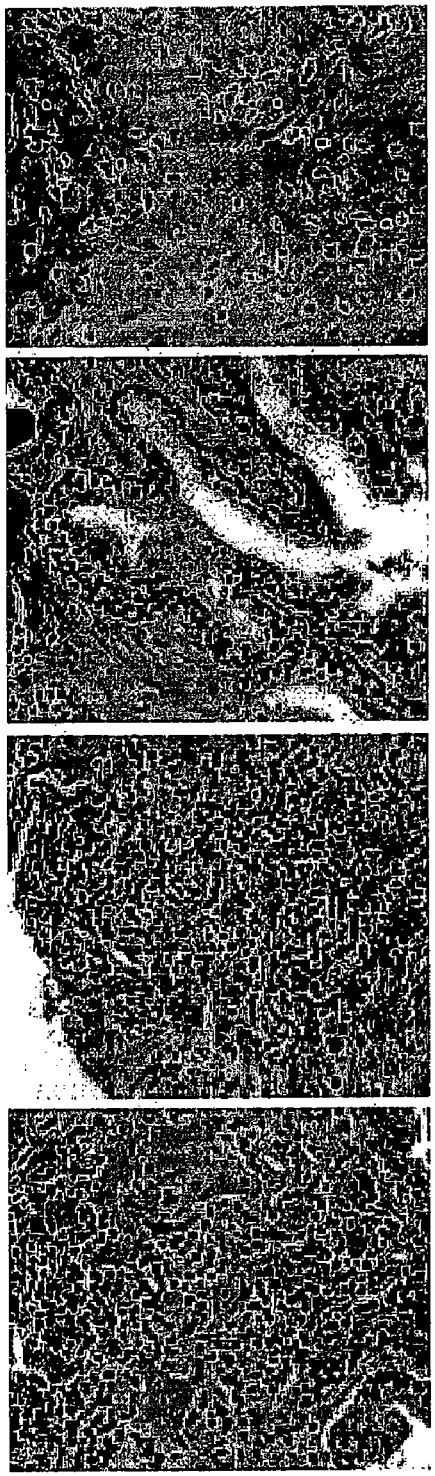

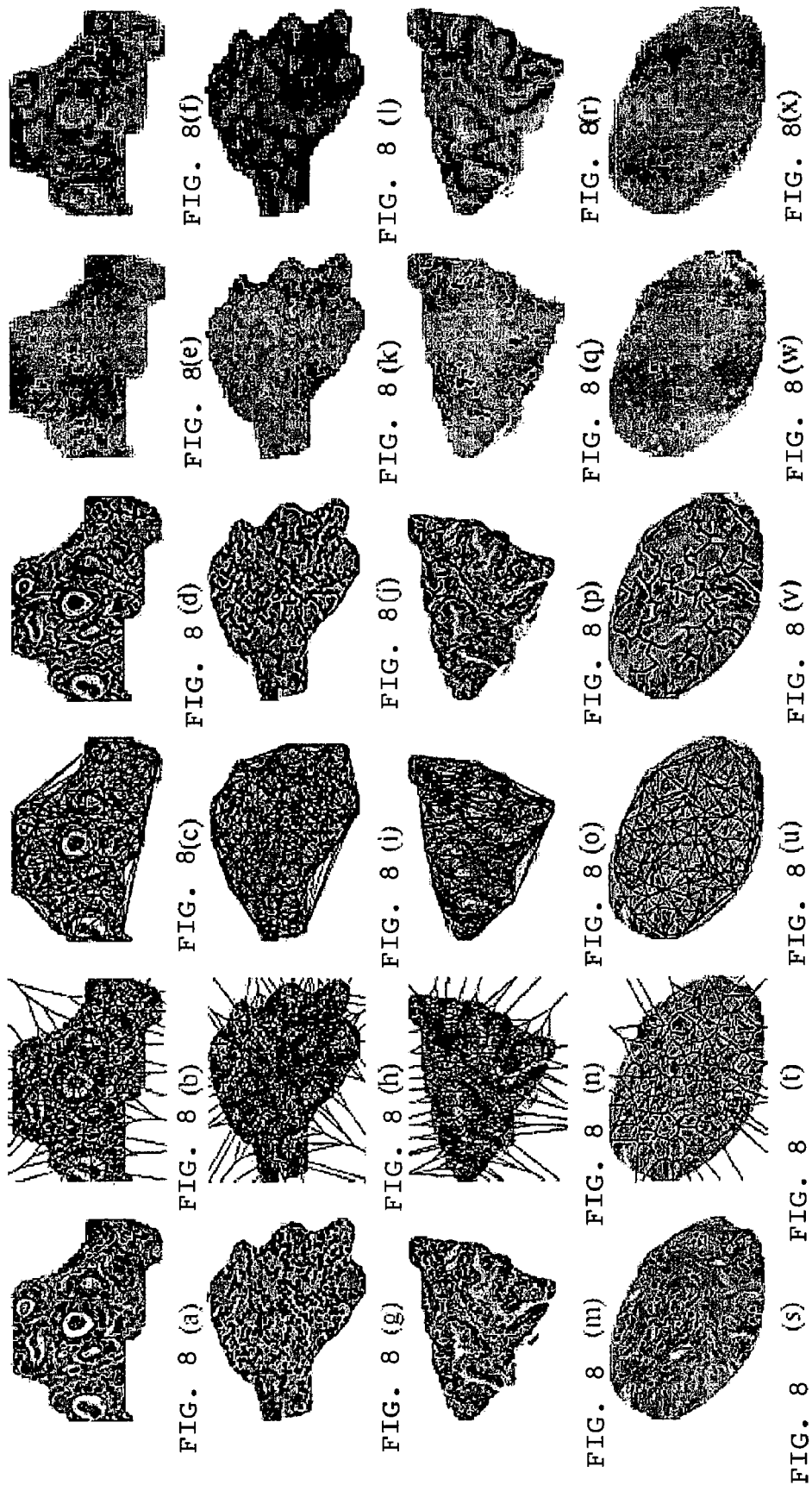

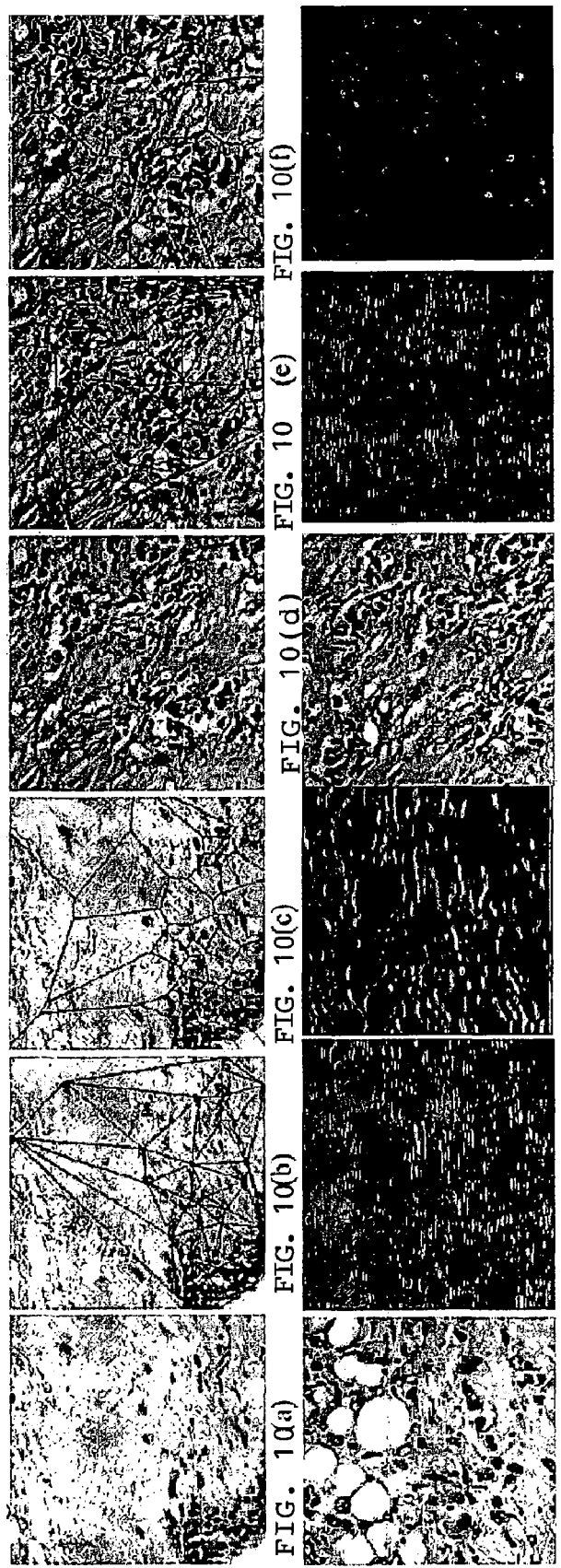

MALIGNANCY DIAGNOSIS USING CONTENT-BASED IMAGE RETREIVAL OF TISSUE HISTOPATHOLOGY

CROSS-REFERENCE TO RELATED APPLICATIONS

This application a National Phase Application of PCT International Application No. PCT/US07/17181, International Filing Date Aug. 1, 2007, claiming priority of United States Provisional Patent Application, 60/834,697, filed Aug. 1, 2006, both which are incorporated herein by reference in their entirety.

FIELD OF INVENTION

This invention is directed to computer-aided diagnostics using content-based retrieval of histopathological image features. Specifically, the invention is directed to the extraction of image features from a histopathological tissue image based on predetermined criteria and their use in the diagnosis and prognosis of malignancy in that tissue.

BACKGROUND OF THE INVENTION

Detection and surgical treatment of the early stages of tissue malignancy are usually curative. In contrast, diagnosis and treatment in late stages often have deadly results.

Histopathological examination, which is a diagnostic method of a tissue specimen, is one of the most important medical tool in process of diagnosis. The histopathological diagnosis of several cancer types is based upon architectural (symmetry, circumscription, maturation, nests, arrangement, distribution), cytological (atypicality, mitosis, necrosis) and other cancer-specific criteria. Nowadays, pathologists know the criteria list that has to be checked by the pathologist in order to diagnose the specimen. The pathological criteria are crucial in order to establish accurate diagnosis and prognosis.

A great deal of research has focused on creating content-based image retrieval (CBIR) systems to assist physicians in analyzing medical image data. A CBIR system relies on a similarity metric to retrieve images from a database. The metric used in most systems is a linear distance measure, but because most systems use a large number of features or dimensions, it is common to use manifold learning (ML) methods to map the data into a low-dimensional space. Images that are similar in a high dimensional space will be mapped close together in the transformed space, preserving object similarities. Although many ML methods have been developed over the years, most CBIR systems employ principal component analysis. A CBIR system was proposed for histopathology in that used color histograms, texture, and Fourier coefficients to describe the content of histological images from various malignancies, using a weighted cosine measure to determine image similarity. However, quantitative evaluation of the system with different feature sets and ML methods was not done.

In view of the above, there is an urgent need for a systematic medical decision support system for the examination of histopathological tissue images and diagnosis of benign and malignant pathologies while being able to provide prognosis and select appropriate treatment modalities.

SUMMARY OF THE INVENTION

In one embodiment, the invention provides a computer-aided diagnostic method to predict the probability that a histological image contains a malignant region comprising: obtaining a histological image, wherein the histological image is a first of a series of images ordered in increasing magnification; identifying a region or regions of said histological image classified as suspect; extracting one or more image features from at least one of said identified regions; reducing a dimensionality of said extracted feature data; and classifying said extracted region or regions as either benign, malignant, or suspect based on at least one said extracted image feature, whereby if said extracted region or regions are classified as malignant, the histological image has a malignant region, otherwise; if the extracted region or regions are classified as benign, then the histological image does not have a malignant region; or if the extracted region or regions are classified as suspect, the next histological image in the series is obtained and the steps of identifying, extracting, reducing and classifying are repeated.

In another embodiment, the invention provides a computer-aided diagnostic method to predict the probability that a histological image of a prostate tissue contains a malignant region comprising: obtaining a prostate histological image, wherein the histological image is a first of a series of images ordered in increasing magnification; identifying a region or regions of said histological image classified as suspect; extracting one or more image features from at least one of said identified regions; reducing the dimensionality of said extracted feature data; and classifying said extracted region or regions as either benign, malignant, or suspect based on at least one said extracted image feature, whereby if said extracted region or regions are classified as malignant, the histological image has a malignant region, otherwise; if the extracted region or regions are classified as benign, then the histological image does not have a malignant region; or if the extracted region or regions are classified as suspect, the next histological image in the series is obtained and the steps of identifying, extracting, reducing and classifying are repeated.

In one embodiment, the invention provides a computer-aided diagnostic method to predict the probability that a histological image of a breast tissue contains a malignant region comprising: obtaining a breast histological image, wherein the histological image is a first of a series of images ordered in increasing magnification; identifying a region or regions of said histological image classified as suspect; extracting one or more image features from at least one of said identified regions; reducing the dimensionality of said extracted feature data; and classifying said extracted region or regions as either benign, malignant, or suspect based on at least one said extracted image feature, whereby if said extracted region or regions are classified as malignant, the histological image has a malignant region, otherwise; if the extracted region or regions are classified as benign, then the histological image does not have a malignant region; or if the extracted region or regions are classified as suspect, the next histological image in the series is obtained and the steps of identifying, extracting, reducing and classifying are repeated.

In another embodiment, the invention provides a content-based image retrieval (CBIR) system for the comparison of novel histopathological images with a database of histopathological images of known clinical significance, comprising: obtaining a histological image; extracting one or more content-based image features from said image; storing said one or more content-based image features in a computer readable media as a database image; constructing said computer readable media to hold one or more such database images; and comparing a query image not included in said database images and one or more of said database images.

Other features and advantages of the present invention will become apparent from the following detailed description examples and figures. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The invention will be better understood from a reading of the following detailed description taken in conjunction with the drawings in which like reference designators are used to designate like elements, and in which:

FIG. 3 shows examples of graphs superimposed on a patch of Gleason grade 4 tissue (a). Shown are (b) the Voronoi Diagram, (c) the Delaunay Triangulation, and (d) the Minimum Spanning Tree;

FIG. 4 shows examples of (a) Gleason grade 3 gland and (b) Gleason grade 4 gland. The lumen boundary is shown in white;

FIG. 5 shows scatter plots obtained through (a) MDS and (c) PCA, with a closeup of the boxed region. The PR curve for all classes obtained using (b) MDS and (d) PCA. Shown are images from Gleason grade 3 (green circles), Gleason grade 4 (blue squares), and benign epithelium (red triangles). Class clusters are manually indicated in black;

FIG. 6 shows digitized histological tissue patches corresponding to (a) Gleason grade 3 adenocarcinoma, (b) grade 4 adenocarcinoma, (c) benign epithelium, and (d) benign stroma;

FIG. 7 shows (a) A region of benign epithelium comprising 6 glands, (b) a gland from (a) magnified, and (c) one of the nuclei surrounding the gland in (b), also magnified;

FIG. 8 shows a comparison of ((a)-(f)) Gleason grade 3 tissue, ((g)-(l)) grade 4 tissue, ((m)-(r)) benign epithelium, and ((s)-(x)) benign stroma. Superimposed on ((a), (g), (m), (s)) the original images are ((b), (h), (n), (t)) the Voronoi diagram, ((c), (i), (o), (u)) the Delaunay triangulation, ((d), (j), (p), (v)) the minimum spanning trees, ((e), (k), (q), (w)) pixel entropy texture feature, and ((f), (l), (r), (x)) Gabor filter (s=3, θ=5π 8);

FIG. 10 shows the features used in image classification. (a-c,g-h) low-, and (d-f,j-l) high-grade breast cancers. Shown are the original images (a, e), and corresponding graphical maps (Voronoi diagram (b, e), Delaunay triangulation (c, f) obtained by connecting nuclei. Features quantifying tissue architecture and cellular arrangement will be extracted from these graphs to characterize the different histological cancer types and sub-types. Corresponding texture feature representations for (g), (j) Gabor filter (θ=Π/2, scale=1), (h), (k) Gabor filter (θ=3Π/2, scale=2), and (i), (l) Gradient magnitude;

DETAILED DESCRIPTION OF THE INVENTION

Figures 1A, 1B, 1C, 1D, 1E, 1F:
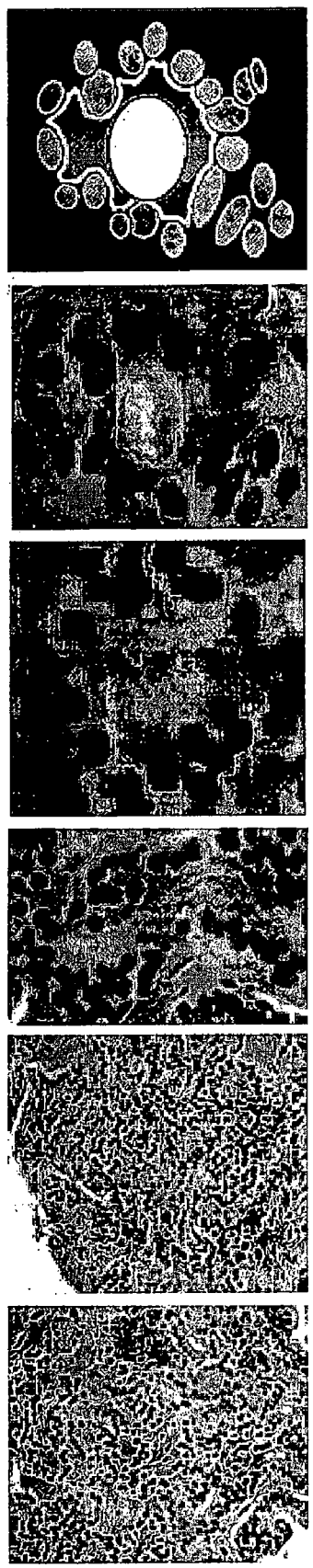
FIG. 1 show examples of (a) Gleason grade 3 tissue, (b) Gleason grade 4 tissue, (c) a gland from (a) magnified, (d) a gland from (b) magnified, (e) a benign gland, and (f) an illustration of the lumen and nuclei comprising the gland in (e)

This invention relates in one embodiment to computer-aided diagnostics using content-based retrieval of histopathological image features. In another embodiment, the invention relates to the extraction of image features from a histopathological image based on predetermined criteria and their analysis for malignancy determination.

In one embodiment, Computer-aided detection (CAD) refers to the use of computers to analyze medical images to detect anatomical abnormalities therein. In another embodiment, interchangeably with the term computer-aided detection are the terms computer-aided diagnosis, or computer-assisted diagnosis, or computer-assisted detection in other embodiments. In one embodiment, the outputs of CAD systems are sets of information sufficient to communicate the locations of anatomical abnormalities, or lesions, in a medical image, and in other embodiments, can include other information such as the type of lesion, degree of suspiciousness, and the like. CAD results communicated in one embodiment in the form of graphical annotations.

The skilled practitioner will readily recognize that embodiments described herein are applicable for a variety of medical imaging modalities such as computerized tomography (CT) imaging in one embodiment, or magnetic resonance imaging (MRI), positron emission tomography (PET), single-photon emission computed tomography (SPECT), and ultrasound in other distinct embodiments, and even less conventional medical imaging modalities such as thermography, electrical conductivity-based modalities, and the like in other applicable embodiments.

In one embodiment, a CBIR system using features modeled on existing or newly developed paradigms as well as those that were designed outside its purview can be constructed for the benefit of clinical pathologists. In another embodiment, choice of manifold learning (ML) algorithms, or number of reduced dimensions, and feature subsets in other discrete embodiments of the methods and system described herein, are used in designing an optimal CBIR system.

Accordingly, and in one embodiment, provided herein is a computer-aided diagnostic (CAD) method to predict the probability that a histological image contains a malignant region comprising: obtaining a histological image, wherein the histological image is a first of a series of images ordered in increasing magnification; identifying a region or regions of said histological image classified as suspect; extracting one or more image features from at least one of said identified regions; reducing a dimensionality of said extracted feature data; and classifying said extracted region or regions as either benign, malignant, or suspect based on at least one said extracted image feature, whereby if said extracted region or regions are classified as malignant, the histological image has a malignant region, otherwise; if the extracted region or regions are classified as benign, then the histological image does not have a malignant region; or if the extracted region or regions are classified as suspect, the next histological image in the series is obtained and the steps of identifying, extracting, reducing and to classifying are repeated.

In another embodiment, the images used in the methods and systems to predict the probability that a histological image contains a malignant region and its severity, provided herein are ordered in a series of increasing magnification. In one embodiment, the increase in magnification is between about 1-6 orders of magnitude and is taken by different imaging means, such as a light microscope for the lowest magnification in one embodiment, and PET or Tunneling Electron Microscope in another embodiment for the higher magnification. The skilled person in the art would recognize that the choice of magnification and imaging means can be optimized based on the tissue and purpose of the imaging used for carrying out the methods provided herein.

In another embodiment, the image feature extracted in the methods and systems described herein is a statistical feature. In another embodiment, the image feature extracted is a Haralick co-occurrence feature. In another embodiment, the image feature extracted is a Haar wavelet feature. In another embodiment, the image feature extracted is a Gabor feature. In another embodiment, the image feature extracted is calculated independently from each channel of a digitized image using a sliding window of 3×3 pixels, or in another embodiment, from 5×5 pixels, or in another embodiment, from 7×7 pixels. In one embodiment, the Haralick co-occurrence feature, which is a statistic feature extracted in the methods and systems described herein, is an angular second moment. In another embodiment, the Haralick co-occurrence feature is a contrast. In another embodiment, the Haralick co-occurrence feature is a correlation. In another embodiment, the Haralick co-occurrence feature is a variance. In another embodiment, the Haralick co-occurrence feature is an entropy. In another embodiment, the Haralick co-occurrence feature is an inverse difference moment. In another embodiment, the Haralick co-occurrence feature is a sum average. In another embodiment, the Haralick co-occurrence feature is a sum variance. In another embodiment, the Haralick co-occurrence feature is a sum entropy. In another embodiment, the Haralick co-occurrence feature is a difference variance, or a difference entropy in another embodiment.

In one embodiment, the Haralick co-occurrence describes texture in terms of the statistical distribution of the grayscale pixel values within an image, such as in a grayscale of a histological image used in the methods and systems described herein. In the analysis, let $s_1=(x_1, y_1)$ and $s_2=(x_2, y_2)$ be two pixels in the image, and let $s_1$ and $s_2$ be separated by a displacement of $d=(d_x, d_y)$ pixels so that $s_2=(T_2, y_2)=(T_1+d_x, y_1+d_y)=s_1+d(2.5)$ For a fixed displacement d, statistical methods assume that the probability that $s_1$ and $s_2$ take on grayscale values of i and j, respectively, is governed by the joint probability mass function (PMF) $P(i, j; d)$. We may equivalently reference the separation displacement between $s_1$ and $s_2$ by an absolute distance d and angle .theta. relative to the horizontal axis. The PMF of the spatial grayscale values becomes in this case $P(i, j; d, \theta)$.

Since the true grayscale distribution $P(i, j; d, \theta)$ is not known, it is estimated from empirical data. In another embodiment, Haralick accomplishes this with the so-called co-occurrence matrices. For an image I of size $N_x \times N_y$ with the set of distinct grayscale values $G=\{1, 2, \ldots, N_g\}$, Haralick's method creates symmetric co-occurrence matrices $P(i, j; d, \theta)$ with i, j∈G specifying grayscale values, $\theta \in \{0°, 45°, 90°, 135°\}$ defining an angular direction and d representing the user-defined pixel distance. The (i, j) entry of $P(i, j; d, \theta)$ holds the total number of pixel pairs in the image, normalized by the total number of pixels in the image, with grayscale values i and j such that the two pixels in the pairs lie d pixels apart in the angular direction θ. [Robert M. Haralick, K. Shanmugam, and Its'Hak Dinstein. Textural features for image classification. IEEE Transactions on Systems, Man and Cybernetics, 3(6):610621, 1973]. Thus, for any specified d value, the method produces four co-occurrence matrices, one for each of the four θ values specified above. The value of d specifies the size of the neighborhood over which it is feasible to estimate the PMF of the grayscale distribution. In one embodiment, the resulting co-occurrence matrices serve as an estimate of the true grayscale distribution of the image.

The term "statistical feature" refers in one embodiment to preselected substructures which are larger than a certain threshold value τ chosen based on their statistically significant sub-structures statistic. That statistic is in one embodiment an average. In another embodiment, the statistic is a median. In another embodiment, the statistic is a standard deviation. In another embodiment, the statistic is a difference. In another embodiment, the statistic is a Sobel filter. In another embodiment, the statistic is a Kirsch filter. In another embodiment, the statistic is a horizontal derivative. In another embodiment, the statistic is a vertical derivative. In another embodiment, the statistic is a diagonal derivative of a preselected determinant. In another embodiment, the statistic is a combination of factors.

In another embodiment, the Haar wavelet feature extracted from the histological image series described herein, used in the methods and systems provided herein, is the result of a convolution of said image with a Haar wavelet kernel. In one embodiment, the Gabor feature is the result of convolving the image used in the methods and systems described herein, with a bank of Gabor filters, generated by convolving a Gaussian function with a sinusoid at a range of scale and orientation parameter values. In another embodiment, the Gabor filters used in the methods and systems described herein, is a linear filter whose impulse response is defined by a harmonic function multiplied by a Gaussian function. In another embodiment, because of the multiplication-convolution property, the Fouriers transform of a Gabor filter's impulse response is the convolution of the Fourier transform of is the harmonic function and the Fourier transform of the Gaussian function. In one embodiment, the term "convolution" refers to a mathematical operator which takes two functions f and g and produces a third function that represents the amount of overlap between f and a reversed and translated version of g. In another embodiment, convolution refers to a general moving average, by making one of the functions an indicator function of an interval.

In one embodiment, the step of reducing the dimensionality in the methods and systems for predicting the probability that a histological image contains a malignant region and its severity and grading in certain embodiments, is done by using a principal component analysis. In another embodiment, reducing the dimensionality is carried out by a linear dimensional analysis. In another embodiment, reducing the dimensionality is carried out by a multidimensional scaling. In another embodiment, reducing the dimensionality is carried out by a graph embedding. In another embodiment, reducing the dimensionality is carried out by an ISOMAP. In another embodiment, reducing the dimensionality is carried out by a local linear embedding. In another embodiment, reducing the dimensionality is carried out by a kernel-based principal component analysis. In another embodiment, reducing the dimensionality is carried out by a semidefinite embedding. In another embodiment, reducing the dimensionality is carried out by Laplacian eigenmaps. In another embodiment, reducing the dimensionality is carried out by a combination thereof. In one embodiment, the methods used to reduce dimensionality of the image features extracted from the histological images described herein, are collectively referred to as "Manifold Learning" (ML).

A person skilled in the art would readily recognize that the choice of ML used in the methods described herein may be optimized for several factors, such as without limiting, the tissue type, the image feature used, the imaging means and the like. Also considered in other embodiments, are methods as finite element and cluster analysis. In one embodiment, the term "reducing dimensionality" refers to mathematical techniques used to reduce multivariable data sets, to a lower number of data sets, or "dimensions" for analysis. In one embodiments, these techniques use several algorithms to explain the variability among the observed variables with 1, 2 . . . n variables in which n is a much lower dimensionality number than initially observed.

In one embodiment, the step of classifying the extracted region or regions from the histological image as either benign, malignant, or suspect based on the extracted image feature in the methods described herein, further comprises the steps of creating a likelihood scene for the selected image; creating a mask identifying regions of said selected image as benign or suspect by thresholding said likelihood scene at a value determined through system training, or in another embodiment manifold learning; and classifying the extracted region or regions as either benign, malignant, or suspect based on said mask, whereby if the region or regions are classified as suspect in one embodiment, said mask is resized by interpolation to the size of the subsequent image magnification in the ordered series to identify suspect regions on said subsequent image. In one embodiment, the suspect region in the subsequent image obtained at another time, or in another embodiment, in different imaging means. As used herein, the term "resized" denotes the selection of the observed suspect region in a subsequent image based on the ordering of the images. In one embodiment, the ordering of the images may be resolution, or in another embodiment, the application of different filtering systems. Accordingly, a subsequent image is in one embodiment a grayscale image followed by a subsequent image at the same magnification but which is a color image.

The term "mask" refers in one embodiment to a technique for isolating the edges in an image, amplifying them, and then adding them back into the image. In another embodiment, the term "scene", or "likelihood scene" is used in the context of the recognition and localization of generic object classes in the histological images used in the methods and systems described herein. In another embodiment, a likelihood scene use a combination of image features in order to classify the extracted region according to whether it contains instances of a given object, such as a nucleus in one embodiment, or thickness of membranes, calcium deposits and the like in other embodiments. In one embodiment, the likelihood scene is selected based on a decision tree algorithm, which, in another embodiment is a part of the readable computer media used to carry out the methods and systems described herein. In one embodiment, the likelihood scene is selected based on a Support Vector Machine (SVM) algorithm. The term "Support Vector Machine algorithm" refers in one embodiment to a set of related learning methods used for classification and regression. In another embodiment, SVM algorithms simultaneously minimize the empirical classification error and maximize the geometric margin and are interchangeably as maximum margin classifiers in another embodiment.

Accordingly and in one embodiment, SVM uses extracted features to discriminate between each pair of prostate tissue types of Gleason grade 3 vs. grade 4, grade 3 vs. benign epithelium, or in another embodiment between grade 3 vs. benign stroma, or in another embodiment between grade 4 vs. benign epithelium, or in another embodiment between grade 4 vs. benign stroma, and or in another embodiment between benign epithelium vs. benign stroma. In another embodiment, a third of the data from each group is used for training the classifier and the rest was used for testing. Since SVMs perform classification in a high-dimensional space, local linear embedding (LLE) is applied in one embodiment to reduce the dimensionality of the feature space prior to classification.

In one embodiment, the likelihood scene is determined by an Adaboost algorithm using Bayes Decision Theorem. In another embodiment, the likelihood scene is determined at least partially by an image feature extracted from one or more training images. In one embodiment, the term "AdaBoost" refers to adaptive boosting algorithm consisting of a class of concrete algorithms that is adaptive through forcing subsequent classifiers built to be tweaked in favor of those instances misclassified by previous classifiers. In another embodiment, for each measured feature in the extracted features of the histological images used in the methods and systems described herein, a distribution of weights D, is updated, indicating the importance of examples in the data set for the classification. On each iteration, the weights of each suspect classified example are increased (or in another embodiment, the weights of each benign or malignant classified example are decreased), so that the new classifier focuses more on those examples.

In one embodiment, the methods described hereinabove are used for the methods described herein. Accordingly and in another embodiment, provided herein is a method for histopathological analysis of a gland tissue sample, comprising obtaining a histological image, wherein the histological image is a first of a series of images ordered in increasing magnification; identifying a region or regions of said histological image classified as suspect; extracting one or more image features from at least one of said identified regions; reducing a dimensionality of said extracted feature data; and classifying said extracted region or regions as either benign, malignant, or suspect based on at least one said extracted image feature, whereby if said extracted region or regions are classified as malignant, the histological image has a malignant region, otherwise; if the extracted region or regions are classified as benign, then the histological image does not have a malignant region; or if the extracted region or regions are classified as suspect, the next histological image in the series is obtained and the steps of identifying, extracting, reducing and classifying are repeated, whereby the step of classifying the extracted region or regions from the histological image as either benign, malignant, or suspect based on the extracted image feature in the methods described herein, further comprises the steps of creating a likelihood scene for the selected image; creating a mask identifying regions of said selected image as benign or suspect by thresholding said likelihood scene at a value determined through system training, or in another embodiment manifold learning; and classifying the extracted region or regions as either benign, malignant, or suspect based on said mask, whereby if the region or regions are classified as suspect in one embodiment, said mask is resized by interpolation to the size of the subsequent image magnification in the ordered series to identify suspect regions on said subsequent image; identifying those regions classified as suspect; extracting an image feature from the suspect region; if necessary, reducing the dimensionality of the extracted image feature; and classifying the selected image region as a cancerous tissue of a specific clinical stage of malignancy, or a benign epithelium, or a benign stroma based on said at least one extracted image feature, thereby being a method of a histopathological analysis.

In another embodiment, the image feature extracted in the methods described herein, for a histopathological analysis of a gland tissue is an architectural feature. In one embodiment, the image feature is a nuclear density. In one embodiment, the image feature is a gland morphology. In one embodiment, the image feature is a global texture feature. In one embodiment, the image feature is a combination of features. In one embodiment, the image feature extracted for the methods and systems provided herein, is gland specific and may include other features.

In one embodiment, the architectural feature extracted in the methods described herein is calculated from a Voronoi diagram. In another embodiment, the architectural feature is calculated from a Delaunay graph. In another embodiment, the architectural feature is calculated from a minimum spanning tree constructed from the nuclei centers in the image. In another embodiment, the architectural feature is calculated from a co-adjacency matrix constructed from the gland centers in the image.

In one embodiment, the term "Voronoi diagram" refers to a decomposition of a metric space determined by distances to a specified discrete set of objects in the space. In another embodiment, the term "Voronoi diagram" is used interchangeably with the terms "Voronoi tessellation", "Voronoi decomposition" or "Dirichlet tessellation". In one embodiment, for a set of points S, the Voronoi diagram for S is the partition of the plane which associates a region V(p) with each point p from S in such a way that all points in V(p) are closer to p than any other point from S. Application of the Voroni diagram are further described in the Examples hereinbelow.

In one embodiment, the term "Delaunay Graph", refers to the depiction of Delaunay triangulation. In another embodiment, Delaunay graph of a set of points P is the dual graph of the Voronoi diagram of P. In one embodiment, if two sites $s_i$ and $s_j$ share an edge (s; and $s_j$ are adjacent), an arc is created between $v_i$ and $v_j$, the vertices located in sites $s_i$ and $s_j$. In another embodiment, the arcs are straightened into line segments, resulting in a Dealunay graph of P set of points ($DG_{(P)}$). In one embodiment, the P point set is the nuclei centers in the image extracted from the histological gland images used in the methods described herein. In one embodiment, the architectural feature computed from a Delaunay graph is the standard deviation, average, ratio of minimum to maximum, or disorder of the side lengths or areas of the triangles in the Delaunay graph of the histological images used in the methods described herein.

In one embodiment, the image feature extracted from the histological image used in the methods described herein, is an architectural feature computed from a minimum spanning tree is the standard deviation, average, ratio of minimum to maximum, or disorder of the edge lengths in the minimum spanning tree of said image. In one embodiment, the image feature extracted from the histological image used in the methods described herein, is an architectural feature which is the co-adjacency matrix, constructed from the gland centers is used to calculate an angular second moment, a contrast, a correlation, a variance, an entropy, an inverse difference moment, a sum average, a sum variance, a sum entropy, a difference variance, or a difference entropy.

In another embodiment, In one embodiment, the image feature extracted from the histological image used in the methods described herein, is nuclear density feature referring in one embodiment to the number or density of nuclei in the image and in another embodiment, its average, standard deviation, or disorder of the distances from each of the nuclei in said image to the 3 nearest neighboring nuclei, or in another embodiment, to the 5 nearest neighboring nuclei, or in another embodiment, to the 7 nearest neighboring nuclei; or the average, standard deviation, or disorder of the number of neighboring nuclei within a circle with a radius of 10, 20, 30, 40, or 50 pixels centered on each nucleus within said image in other discrete embodiments of the methods and systems described herein.

In one embodiment, the image feature extracted from the histological image used in the methods and systems described herein, is gland morphology, which is calculated from the boundary of either the gland lumen in one embodiment, or interior nuclei in another embodiment, as the ratio of the gland area to the area of the smallest circle that circumscribes the gland; or the standard deviation, variance, or ratio of the maximum to the average distance between the gland center and the boundary; the ratio of the estimated boundary length (the boundary calculated using a fraction of the boundary pixels) to the actual boundary length; ratio of the boundary length to the area enclosed by the boundary; and the sum of the difference between the distance from the center of the gland to the boundary and the average of the distances from the center to the two adjacent points in other embodiments of gland morphology used as the extracted image feature in the methods and systems described herein.

In one embodiment, the image feature extracted from the histological image used in the methods described herein, is a global texture feature that is an average, or a median, a standard deviation, a range, an angular second moment, a contrast, a correlation, a variance, an entropy, a sum average, a sum variance, a sum entropy, a difference variance, a difference entropy, a difference moment, or a Gabor filter in other embodiments. In one embodiment, the term "Global texture feature" refers to a small number of numerical values used to define an image or a region in an image.

In one embodiment, the methods described hereinabove, are used to diagnose the presence of malignancy in a prostate. Accordingly and in one embodiment, provided herein is a computer-aided diagnostic method to predict the probability that a histological image of a prostate tissue contains a malignant region comprising: obtaining a prostate histological image, wherein the histological image is a first of a series of images ordered in increasing magnification; identifying a region or regions of said histological image classified as suspect; extracting one or more image features from at least one of said identified regions; reducing the dimensionality of said extracted feature data; and classifying said extracted region or regions as either benign, malignant, or suspect based on at least one said extracted image feature, whereby if said extracted region or regions are classified as malignant, the histological image has a malignant region, otherwise; if the extracted region or regions are classified as benign, then the histological image does not have a malignant region; or if the extracted region or regions are classified as suspect, the next histological image in the series is obtained and the steps of identifying, extracting, reducing and classifying are repeated. In one embodiment, no reduction in dimensionality is necessary and the data set is used as-is.

In another embodiment, provided herein is a computer-aided diagnostic method to predict the probability that a histological image of a renal tissue contains a malignant region comprising: obtaining a prostate histological image, wherein the histological image is a first of a series of images ordered in increasing magnification; identifying a region or regions of said histological image classified as suspect; extracting one or more image features from at least one of said identified regions; reducing the dimensionality of said extracted feature data; and classifying said extracted region or regions as either benign, malignant, or suspect based on at least one said extracted image feature, whereby if said extracted region or regions are classified as malignant, the histological image has a malignant region, otherwise; if the extracted region or regions are classified as benign, then the histological image does not have a malignant region; or if the extracted region or regions are classified as suspect, the next histological image in the series is obtained and the steps of identifying, extracting and classifying are repeated.

In one embodiment, the histological images used in the methods and systems described herein, are generated by pyramidal decomposition.

In another embodiment, provided herein is a computer-aided diagnostic method to predict the probability that a histological image of a breast tissue contains a malignant region comprising: obtaining a prostate histological image, wherein the histological image is a first of a series of images ordered in increasing magnification; identifying a region or regions of said histological image classified as suspect; extracting one or more image features from at least one of said identified regions; reducing the dimensionality of said extracted feature data; and classifying said extracted region or regions as either benign, malignant, or suspect based on at least one said extracted image feature, whereby if said extracted region or regions are classified as malignant, the histological image has a malignant region, otherwise; if the extracted region or regions are classified as benign, then the histological image does not have a malignant region; or if the extracted region or regions are classified as suspect, the next histological image in the series is obtained and the steps of identifying, extracting and classifying are repeated.

In one embodiment, the methods and the embodiments described hereinabove, are used in the content-based image retrieval system for the comparison of novel histopathological images with a database of histopathological images of known clinical significance. Accordingly and in one embodiment, provided herein is a content-based image retrieval system for the comparison of novel histopathological images with a database of histopathological images of known clinical significance, comprising: obtaining a histological image; extracting one or more content-based image features from said image; storing said one or more content-based image features in a computer readable media as a database image; constructing said computer readable media to hold one or more such database images; and comparing a query image not included in said database images and one or more of said database images. In one embodiment, the systems described herein further comprise means for sorting retrieved images according to their image content similarity to the query image; and displaying said retrieved images to the user in the order of said sorting, whereby, in one embodiment, the first displayed image is most similar to said query image. In another embodiment, the image feature described hereinabove, is used in the systems of the invention. In one embodiment, the similarity between one or more retrieved images and said query image is determined through the use of one or more distance metrics, whereby in another embodiment the distance metrics is Minkowski distance, or Mahalanobis, Hamming, Levenshtein, Chebyshev, geodesic, tangent, or earth mover's distance or their combination in other discrete embodiments.

In one embodiment, the retrieved images used in the systems described herein are sorted by increasing distance such that in another embodiment, the first in the set of retrieved images is most similar to said query image in view of the measured distance metric.

In one embodiment, Minkowski's distance of P data points refers to:

$$1\text{-norm distance} = \sum_{i=1}^{n} |x_i - y_i|$$

$$2\text{-norm distance} = \left(\sum_{i=1}^{n} |x_i - y_i|^2\right)^{1/2}$$

$$P\text{-norm distance} = \left(\sum_{i=1}^{n} |x_i - y_i|^p\right)^{1/p}$$

$$\text{Infinity norm distance} = \lim_{p\to\infty}\left(\sum_{i=1}^{n} |x_i - y_i|^p\right)^{1/p}$$
$$= \max(|x_1 - y_1|, |x_2 - y_2|, \ldots, |x_n - y_n|).$$

In one embodiment, provided herein is a content-based image retrieval system for the comparison of novel histopathological images with a database of histopathological images of known clinical significance, comprising: obtaining a histological image; extracting one or more content-based image features from said image; storing said one or more content-based image features in a computer readable media as a database image; constructing said computer readable media to hold one or more such database images; and comparing a query image not included in said database images and one or more of said database images, whereby the display of said retrieved images is performed via a graphical user interface to the user in the order of said ranking of said retrieved images, as well as text output indicating the results of said distance metric comparison The term "about" as used herein means in quantitative terms plus or minus 5%, or in another embodiment plus or minus 10%, or in another embodiment plus or minus 15%, or in another embodiment plus or minus 20%.

The following examples are presented in order to more fully illustrate the preferred embodiments of the invention. They should in no way be construed, however, as limiting the broad scope of the invention.

EXAMPLES

Example 1

Using Manifold Learning for Content-Based Image Retrieval of Prostate Histopathology Prostate cancer is the most commonly diagnosed cancer among males in the U.S., with 200,000 new cases and 27,000 deaths predicted for 2007 (source: American Cancer Society). Currently manual examination of prostate biopsy samples under a microscope by an expert pathologist is the gold standard of prostate cancer diagnosis and grading. In the U.S., the most common system of numbering or \grading" prostate tissue (assessing degree of malignancy) is the Gleason scale [1], which assigns grades on a scale from 1 (well-differentiated, relatively benign tissue) to 5 (non-differentiated tissue, highly invasive cancer).

The Gleason paradigm illustrates how cancer grades differ in terms of their architecture (spatial arrangement of nuclei and glands within the tissue with respect to their centers of mass) and morphology (shape and size of glands and nuclei). Glands and nuclei both express architectural and morphological changes as cancer progresses from benign to malignant. An example of tissue regions of Gleason grade 3 tissue is shown in FIG. 1 (a), grade 4 tissue in FIG. 1 (b), a single grade 3 gland in FIG. 1 (c), and a grade 4 gland in FIG. 1 (d). A gland from benign epithelial tissue is shown in FIG. 1 (e). An illustration of the lumen (white region) and nuclei (grey ellipses) of the gland in FIG. 1 (e) is shown in (f). A number of studies have identified issues with the Gleason system, including high degrees of observer variability, with tissue under-grading as high as 48%. Because of the diagnostic importance of Gleason grading, a quantitative system for assisting pathologists in analyzing histopathology will improve patient care by providing an accurate and standardized grading tool.

In this Example, a CBIR system for prostate histopathology is shown. The performance of the system is evaluated by looking at nearly 600 features characterizing texture, morphology, and architecture of histopathological images. 7 manifold learning methods are used to reduce the data to between 1 and 10 different dimensions. The system tested on 56 studies that were identified as Gleason grade 3 (23 studies), grade 4 (14 studies), and benign epithelium (19 studies) by an expert pathologist.

System Overview

Figure 2:
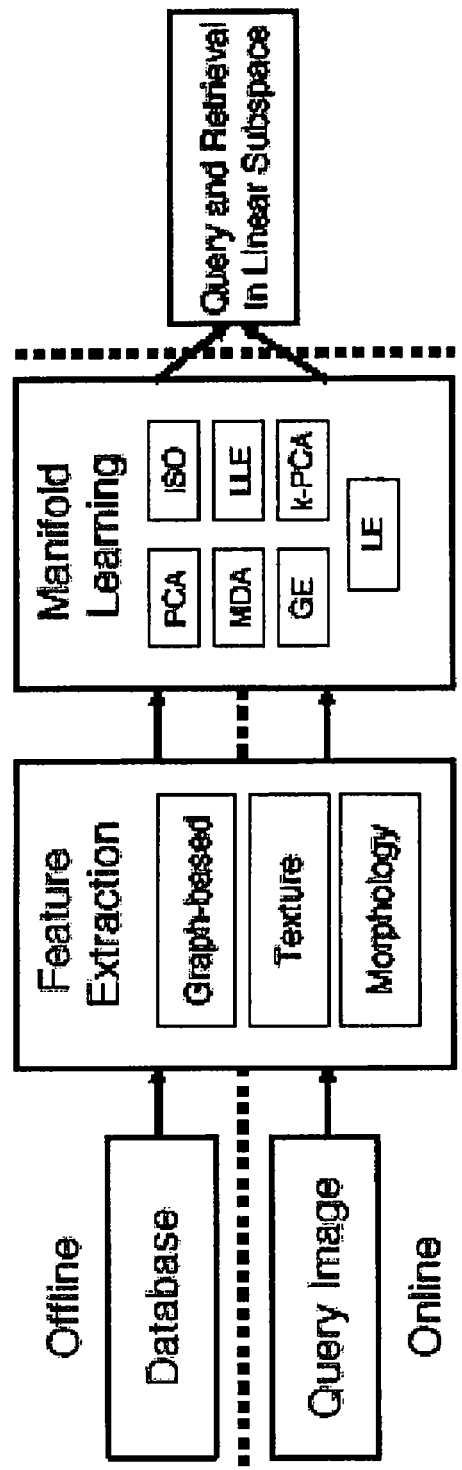
FIG. 2 shows an overview and organization of the CBIR system for automated retrieval of prostate histopathology images.

An overview of the system is shown in FIG. 2. Offline, a database of histopathological prostate images is constructed by extracting graph-based, texture, and morphological features from a series of images. These images are then reduced into a low-dimensional space using one of several manifold learning (ML) methods. In this example, considered are: principal component analysis (PCA), multidimensional scaling (MDS), graph embedding (GE), Isomaps (ISO), local linear embedding (LLE), kernel-based PCA (k-PCA), and laplacian eigenmaps (LE). Online, a query image is run through the feature extraction algorithm and plotted into the reduced dimensional space using the same ML algorithm that was used in the building of the database. Finally, in the low dimensional space, a linear Euclidean distance metric is used to rank the database images in order of similarity to the query image. The returned images are then output to the user for analysis. A returned image is \relevant" if it is the same class as the query image (Gleason grade 3, grade 4, or benign epithelium), and \irrelevant" otherwise. By comparing MAP values, a determination of the following is possible: (1) which dimensionality reduction algorithm yields the best retrieval precision, (2) the optimal number of dimensions for each ML method, and (3) which feature classes perform best in describing the database and query images in the CBIR system. A Student's t-test was performed to determine if the difference in performance when using different classes of features is statistically significant.

Feature Extraction

Hematoxylin and eosin stained prostate biopsy cores are imaged on a high resolution whole slide digital scanner at 40× magnification and saved on a computer workstation. We denote a tissue region R by a digital image $C^R=(C; f)$ where C is a 2D grid of image pixels $c \in C$ and f is a function that assigns an intensity to c. $C^R$ comprises k glands with centroids at manually labeled pixels $c_g^1, c_g^2, \ldots c_g^k$. $C^R$ also comprises m nuclei (grey ellipsoids in FIG. 1 (f)) with centroids at manually labeled pixels $c_n^1, c_n^2, \ldots c_n^m$.

Nuclear Features

The following 25 features were computed directly from the spatial location of the centroids of the nuclei in $C^R$ to characterize nuclear proliferation. (1) The density of the nuclei in $C^R$ is computed as $$D = \frac{m}{C},$$

where |C| is the cardinality of C. $S_K$ denotes the set of K-nearest neighbors of nuclear centroid $c_a n$ where $K \in \{3; 5; 7\}$ and $\alpha \in \{1; 2; \ldots; m\}$. Average nuclear distance of $c^\alpha_n$ is given by $$d_{C_n^a, K} = \frac{1}{S_K} \sum_{C \in S_K} \|C_n^a - C\|.$$

The overall average nuclear distance $$\mu_{n,K}^d = \frac{1}{m} \sum_a d_{C_n^a, K}$$

and standard deviation $\delta^d_{n; K}$ over all $a \in \{1; 2; \ldots, m\}$ is calculated. In addition, a measurement of disorder quantifying the variation of $d_{C_n^a, K}$ for all α is given as $$\psi_{n,K}^d = 1 - \left(1 \Big/ \left(1 + \frac{\mu_{n,K}^d}{\delta_{n,K}^d}\right)\right),$$

giving an additional 9 features for $C^R$. $B_{C_n^a, r}$ denotes a ball of pixels with radius r centered on $c^\alpha_n$. The number of pixels corresponding to nuclear centroids $c_n^j$; $j \neq \alpha$, $j \in \{1, 2, \ldots, m\}$ in $B_{C_n^a, r}$ are counted and the sum denoted as $Q_{C_n^a, r}$. The mean and standard deviation of $Q_{C_n^a, r}$ for $\alpha \in \{1; 2; \ldots, m\}$ are denoted by $\mu_{n,r}^Q$ and $\delta_{n,r}^Q$. The measurement of disorder $\psi_{n,r}^Q$ is also calculated as described above for $\psi_{n,K}^d$. In this example, values of $r \in \{10; 20; \ldots; 50\}$, which were determined empirically were used.

Graph-Based Features to Describe Tissue Architecture

A. Voronoi Diagram

The Voronoi diagram V partitions $C^R$ with a series of polygons. Polygon $P_{C_n^a}$ is constructed around $c^\alpha_n$, creating a tessellation of $C^R$. Every pixel is assigned to a polygon and every polygon is associated with a nuclear centroid. Each $P_{C_n^a}$ has e unique edges $E_{b,b+1}^V, E_{b,b+1,b+2}^V, \ldots, E_{e,b}^V$ between all adjacent vertices with corresponding edge lengths $l_b^V, l_{b+1}^V, \ldots, l_e^V$ and chord lengths H1, H2, ..., Hh between all nonadjacent vertices. Each $P_{C_n^a}$ has a perimeter $$l_E^V = \sum_{i=1}^{e} l_i^V, \text{ total chord length } l_H^V = \sum_{i=1}^{h} H_i,$$

total chord length $l_H^V = \Sigma_{i=1}^h H_i$, and total area $A^V = |P_{C_n^a}|$. The average, standard deviation, ratio of minimum to maximum value, and disorder are computed for $A^V, l_E^V$, and $l_E^V$ of each $P_{C_n^a}$ in $C^R$, giving 12 features.

Delaunay Triangulation

The Delaunay graph D is a graph constructed so that any two unique nuclear centroids $c_n^a$ and $c_n^b$, where a,b∈{1; 2; ...; m}, are connected by an edge $E_{a,b}^D$ if their associated polygons in V share a side. The average, standard deviation, minimum to maximum ratio, and disorder of the areas and edge lengths are computed for all triangles in D, giving 8 features.

Minimum Spanning Tree

Minimum Spanning Tree A spanning tree S of D is a subgraph which connects all $c_n^a$, α∈{1; 2; ...; m} together. A single D can have many S. The minimum spanning tree (MST) denoted by $S^\tau$ has a total length less than or equal to the total length of every other spanning tree. The average, standard deviation, minimum to maximum ratio, and disorder of the edge lengths in ST is computed to obtain an additional 4 and a total of 24 graph-based features Gland Architecture and Morphology Co-Adjacency Features $c_g^1, c_g^2, \ldots c_g^k$ denote the centroids of k glands within $C^R$, and construct a co-adjacency matrix W wherein the value of row u, column v, $W(m,v) = \|c_g^u - c_g^v\|$, u, v∈{1, 2, ..., k}, and $W \in R^{k \times k}$. This matrix describes the inter-gland spatial relationships in a manner similar to the co-occurrence matrix proposed by Haralick to describe the spatial relationships between pixel intensity values. 13 of Haralick's second-order features are calculated from W: angular second moment, contrast, correlation, variance, entropy, sum average, sum variance, sum entropy, difference variance, difference entropy, difference moment, and two measurements of correlation.

Morphological Features

The lumen area is surrounded by a boundary β obtained via a level-set algorithm, where the initial contour is initialized by the user inside the gland near the lumen area (the white region in FIG. 1 (f)) and is allowed to evolve to its final position (white line in FIG. 1 (f)). $l_\beta$ denotes the length of the gland boundary B. The distance from the centroid of the gland $c_g$ to boundary pixel $c_B^\alpha$ is denoted d ($c_g; c_B^\alpha$), where $c_B^\alpha \in B$. The average and maximum of d ($c_g; c_B^\alpha$) is computed over α∈{1; 2; ...; β}. The fractal dimension of the gland boundary was also obtained. Intermediate points $c_B^\gamma \in B$ were picked, where γ∈{3; 6; 9} on B and linearly interpolated between these points to obtain length $l'_B$. The fractal dimensions are obtained as $l_B/l'_B$.

The following values are calculated for each gland in $C^R$: gland area $A_G$, lumen area $A_L$, boundary length $l_B$, number of nuclei surrounding the lumen, and number of layers of nuclei encircling the gland. A number of other features are obtained by considering ratios and combinations of $A_G, A_L, l_B$, and d ($c_g; c_B^\alpha$) for α∈{1; 2; ...; β}, generating 8 values. The average, standard deviation, and measurement of disorder of these 8 features for all k glands is calculated as described in above to yield 24 features for $C^R$. The standard deviation and variance of d ($c_g; c_B^\alpha$) over α∈{1; 2; ...; β}, $l_B/l'_B$, and $(l'_B)^2/A_G$ for each gland. Finally, for any point on the boundary $c_B^\alpha \in B$ and its adjacent points $c_B^{\alpha-1}$ and $c_B^{\alpha+1}$, the smoothness factor is calculated as $U_\alpha = |d(c_g, c_B^\alpha) - (d(c_g, c_B^{\alpha-1}) + d(c_g, c_B^{\alpha+1}))/2|$. The sum of $U_\alpha$ for α∈{1; 2; ...; β} is calculated for each gland. The average of these 7 values are computed over k glands in $C^R$ giving 7 more features for a total of 44 features quantifying gland architecture and morphology.

Texture Description

The average, median, standard deviation, and the range of f(c) is computed for all c∈C for each of the three color channels in the image, yielding 12 first-order statistical features. A co-occurrence matrix $Z \in \Re^{M \times M}$ is constructed for $C^R$ where $M = \max_{c \in C} |f(c)|$ is the maximum pixel value of C. The value in Z(f(b); f(c)) where b,c∈C is given by the number of times intensities f(b) and f(c) occur within a fixed displacement of each other at any orientation. Z is constructed for a displacement of 1. From Z a total of 39 Haralick features are extracted from each image. Finally, a family of 2D Gabor filter kernels is created from a modulating function, which is constructed from a Gaussian function modulated by a sinusoid.

Manifold Learning and Similarity Metric

Manifold learning (ML) methods reduce the dimensionality of a data set from N dimensions to M dimensions, where M<<N, while preserving the high-dimensional relationships between data points. Since class structure is preserved, ML techniques are employed to avoid the curse of dimensionality and to enable the use of a Euclidean similarity metric in a low dimensional embedding space. Many ML techniques have been developed over the years and have been tested on a variety of data sets. Some methods employ a linear algorithm to map the data to a low-dimensional space, while others use a non-linear algorithm, assuming that the data lie on a non-linear manifold in the high-dimensional space. The choice of ML techniques for a particular application is typically arbitrary, since it is difficult to predict which method will produce the best results based on the data. Previously, studies have found that for genome expression data sets, non-linear methods outperform linear methods in mapping out the true class relationships in a low-dimensional space. In this Example, we the 7 ML methods described above were chosen independently of one another to compare their abilities in distinguishing between different grades of prostate cancer using 3 different subsets of features. For each of these methods, we reduce the dataset to dimensions M∈{1; 2; ...; 10}. Results are generated for each M for comparison. In addition to the ML methods, the full data set was analyzed without dimensionality reduction to evaluate whether retrieval in the reduced dimensional space is improved compared to the unreduced space.

Results

Comparing Manifold Learning Methods

By iterating through all of the returned images, the system is evaluated using precision vs. recall (PR) graphs, where precision is the ratio of the number of relevant images retrieved to the total number of retrieved images and recall is the ratio of the number of relevant images to the total number of relevant images in the database. A recall of 1.0 is obtained when all images are retrieved from the database, while a precision of 1.0 is obtained if all retrieved images are relevant. The retrieved images are sorted in order of increasing Euclidean distance from the query image, so that the first image returned is most similar to the query. Each image is queried against the remaining images in the database, and iteration is carried out through each of the returned images to generate a PR graph. The PR graphs obtained for all images of the same class are averaged together. The Mean Average Precision (MAP), an average of the precision for all returned images is calculated as well.

MAP values are shown in Table 1.

TABLE 1

Mean average precision values For each queried class. Shown are the highest MAP over $M \in \{1; 2; \ldots; 10\}$. Boldface values are the highest obtained for each class.

| Feature Type | Query Image | NR | PCA | MDS | GE | ISO | LLE | k-PCA | LE |
|---|---|---|---|---|---|---|---|---|---|
| All Features | Grade 3 | 0.369 | 0.392 | 0.370 | 0.459 | 0.37 | 0.39 | 0.438 | 0.493 |
| | Grade 4 | 0.228 | 0.267 | 0.228 | 0.247 | 0.228 | 0.291 | 0.262 | 0.261 |
| | Benign Epithelium | 0.338 | 0.471 | 0.338 | 0.332 | 0.339 | 0.351 | 0.313 | 0.334 |
| Texture | Grade 3 | 0.370 | 0.444 | 0.370 | 0.460 | 0.370 | 0.406 | 0.388 | 0.468 |
| | Grade 4 | 0.228 | 0.268 | 0.228 | 0.246 | 0.228 | 0.240 | 0.255 | 0.273 |
| | Benign Epithelium | 0.338 | 0.425 | 0.338 | 0.332 | 0.339 | 0.437 | 0.379 | 0.356 |
| Graph | Grade 3 | 0.412 | 0.445 | 0.412 | 0.415 | 0.412 | 0.416 | 0.374 | 0.454 |
| | Grade 4 | 0.264 | 0.270 | 0.264 | 0.277 | 0.264 | 0.302 | 0.240 | 0.317 |
| | Benign Epithelium | 0.331 | 0.405 | 0.331 | 0.412 | 0.331 | 0.400 | 0.357 | 0.373 |
| Morphology | Grade 3 | 0.567 | 0.573 | 0.573 | 0.554 | 0.571 | 0.557 | 0.402 | 0.550 |
| | Grade 4 | 0.396 | 0.417 | 0.396 | 0.385 | 0.396 | 0.383 | 0.229 | 0.391 |
| | Benign Epithelium | 0.462 | 0.465 | 0.466 | 0.518 | 0.469 | 0.518 | 0.484 | 0.566 |

Each row in the table represents the MAP obtained using a particular feature set and class of the query image, and each column shows the ML method used. Because each of the ML methods was used to reduce the data to $M \in \{1; 2; \ldots; 10\}$, the highest MAP values over all M are shown. For each class, the highest MAP values are shown in boldface. In all three classes, the highest MAP values were obtained when using only morphological features. PCA yielded the highest MAP for Gleason grades 3 and 4, while LE produced the highest MAP for benign epithelium. MDS performed as well as PCA when Gleason grade 3 was the query image, but performance decreased when Gleason grade 4 was the to query image. In addition, MAP is highest when the number of dimensions is low (between 1 and 2), suggesting that the majority of the discriminating information is held in only a few dimensions.

Comparing Feature Sets

Table 2 shows the results from a two-tailed paired Student's t-test comparing MAP values is obtained using morphological features alone to those of the indicated feature subsets. In table 2 are shown are the results from two of the ML methods analyzed, MDS and GE. In almost all cases, the values indicate that morphological features result in a statistically significant change in MAP values.

TABLE 2

Results of a two-tailed paired Student's t-test, comparing MAP values for morphology against di_erent subsets of features using two different ML methods. P values less than 0.05 indicate significantly different results.

| | MDS | | | GE | | |
|---|---|---|---|---|---|---|
| Query Image | Texture | Graph | All | Texture | Graph | All |
| Gleason Grade 3 | 6.82E−10 | 1.63E−09 | 6.82E−10 | 5.42E−04 | 8.13E−07 | 5.09E−04 |
| Gleason Grade 4 | 5.68E−05 | 6.64E−04 | 5.68E−05 | 9.00E−04 | 4.06E−03 | 9.37E−04 |
| Benign Epithelium | 4.01E−03 | 4.70E−02 | 4.01E−03 | 3.44E−04 | 8.76E−02 | 3.44E−04 |

Qualitative Results

Qualitative Results from manifold learning are shown in FIG. 5. Feature vectors are plotted in the 3-dimensional subspace obtained through (a) MDS and (c) PCA, as applied to morphological features, which performed the best in quantitative analysis. Points in the scatter plot correspond to Gleason grade 3 (green circles), Gleason grade 4 (blue squares), and benign epithelium (red triangles). Class clusters show some separation between the classes when using the reduced feature vectors. Because of their similar appearance, images representing Gleason grades 3 and 4 generally appear very close to one another in the reduced space. The boxed region contains the majority of points and is shown magnified. Precision vs. recall (PR) curves are also shown in FIG. 5 obtained using (b) MDS and (d) PCA, again using morphological features. For each of the ML methods, the precision of benign epithelium is high for a low number of returned images and decreases as more images are returned, while the Gleason grade 3 images and grade 4 images have consistent precision as the number of retrieved images increases.

Example 2

Grading of Prostate Cancer Using CBIR

The current protocol for prostate cancer diagnosis involves manual analysis of prostate biopsy tissue by a pathologist to determine the presence or absence of cancer in a tissue sample, followed by Gleason grading to assign a number between 1 (early stage cancer) and 5 (highly infiltrative cancer) to grade the invasiveness of the cancer. Gleason grading is currently done by visual analysis of the arrangement, size, and shape of the gland structures and nuclei within the tissue sample. Recently however a number of problems have been identified with the Gleason system:

Variability: Significant levels of inter and intra-observer variability in manual grading of prostate cancer was observed with the rates of undergrading tissue patterns (assigning a tissue a grade lower than its actual grade) as high as 47%. FIG. 6 illustrates these clinical problems, as the difference between intermediate cancer grades (grade 3 (FIG. 1 (a)) and grade 4 (FIG. 1 (b))) is more difficult to distinguish than, between grades 1 and 5.

Lack of Standardization: Changes in grading methodologies over the years and variations in the grading criteria at different institutions make consistent grading difficult.

Limited Feature Set: The Gleason system distinguishes different cancer grades solely on tissue architecture while other attributes such as texture and cellular and glandular morphology are not accounted for.

Computer-aided diagnosis (CAD) techniques for prostate cancer have been proposed to supplement manual visual analysis of biopsy core specimens. At low magnification, systems have been proposed that employ low-level image features such as color and intensity to classify image pixels as "cancer" or "non-cancer," i.e. only object detection. In order to distinguish cancer grades, more detailed information at high magnification such as the arrangement of nuclei and glands is required. Benign epithelial tissue contains large, irregularly-shaped glands, while Gleason grades 2 and 3 have a fewer number of organized, circular glands. Cancer of Gleason grades 4 and 5 have a large number of nuclei in disorganized, infiltrative sheets, with gland lumen that is almost completely occluded and small or nonexistent stromal regions between the glands.

Attempts at automated prostate cancer grading have typically (i) only addressed classification between "high-grade" and "low-grade" cancer, which is not the most difficult clinical problem, and (ii) do not utilize the full range of attributes that could possibly be used. Most of the variability and error in pathologist scoring of Gleason grades is in discriminating between intermediate grades (3 and 4).

In Example 1, a CAD system to detect potentially cancerous areas on digitized prostate histology is presented. In this Example, a system is presented for classifying prostate histology into one of four categories: Gleason grade 3 adenocarcinoma, grade 4 adenocarcinoma, benign epithelium, or benign stroma. Over 100 features are automatically computed from within a tissue patch, including 13 features describing nuclear arrangement, 32 features describing gland size and arrangement, and 57 image texture features. Non-linear dimensionality reduction methods are applied to the feature set and a support vector machine (SVM) is used to classify the different digitized tissue patches into a lower-dimensional space. A Boosting algorithm is applied to find the features that contribute the most discriminating information to the classifier. The novelty of the work shown in this Example, is that the system focuses on distinguishing between intermediate Gleason grades (3 and 4), and the efficacy of textural and morphological features in addition to tissue architecture is explored to distinguish between cancer classes. In addition to automated prostate cancer grading, In addition, the use of additional image features (texture and gland morphology) is integrated into the Gleason grading paradigm.

Materials and Methods

Hematoxylin and eosin stained prostate biopsy cores are scanned into a computer using a high resolution whole slide scanner at 40× optical magnification at the Hospital at the University of Pennsylvania, Department of Surgical Pathology. An expert pathologist labels regions of tissue within each image as Gleason grades 3 adenocarcinoma, grade 4 adenocarcinoma, benign stroma, or benign epithelial tissue. A total of 54 labeled tissue patches were considered for this Example, comprising 11 Gleason grade 3, 7 Gleason grade 4, 17 benign epithelial, and 12 benign stromal regions.

Feature Extraction

The feature set includes graph-based, morphological, and global textural features to capture the architectural tissue patterns and arrangement of glands and nuclei in the sample. A listing of the features considered in this work are given in Table 3.

TABLE 3

Summary of feature types, the number of each feature type, and representative features from each type.

| Feature Type | Number of Features | Representative Features |
|---|---|---|
| Nuclear Architecture | 13 | Voronoi, Delaunay, MST |
| Glandular Architecture | 32 | Gland area, lumen area |
| Global Textural | 57 | Haralick, greylevel, Gabor filter |

Architectural Features

FIG. 7 (a) illustrates a region of benign epithelial tissue made up of six glands, and a single gland is shown in FIG. 7 (b). Each region also contains several nuclei, one of which has been magnified in FIG. 7 (c). An image region R is made up of pixels c, containing m nuclei with centroids $c_n^1, c_n^2, \ldots c_n^m$. In addition R may contain k glands with corresponding centroids $c_g^1, c_g^2, \ldots c_g^k$.

The shape and arrangement of glandular and nuclear structures within a histological image region is related to tissue type Quantifying these structural arrangements into phenotypic signatures allows for efficient classification between Gleason grades. Here 4 separate graphs are constructed and features based on these graphs are extracted. Graphs (A)-(C) describe the spatial arrangement of the nuclei, while graph (D) describes the spatial arrangement of glands. Graphs (A)-(C) were not constructed for gland structures because the low number of glands per region does not yield informative graphs. FIG. 7 illustrates these graphs for Gleason grade 3 (FIG. 7 (a)-(f)), grade 4 (FIG. 7 (g)-(l)), benign epithelium (FIG. 7 (m)-(r)), and benign stroma (FIG. 7 (s)-(x)) tissues.

Voroni Diagram

The Voronoi diagram V comprises a set of polygons $P=\{P1, P2, \ldots, P_m\}$. Any pixel c∈R is included in polygon $P_a$ if $d(c, c^a_n) = \min j\{\|c-c^j_n\|\}$ where $a, j \in \{1, 2, \ldots, m\}$ and $d(c,d)$ is the Euclidean distance between any two pixels $c, d \in R$. The following features are computed from V. The area $N^A(P_j)$ of a polygon Pj is given as |Pj| which is the cardinality of set Pj. The average area is computed $$\hat{N}^A = \frac{1}{m} \sum_{j=1}^{m} N^A(Pj).$$

The disorder of the area is defined as $$D^A = \frac{1}{\left(1 + \frac{\sigma^A}{N^A}\right)}$$

where $\sigma^A$ is the standard deviation over $\mathcal{N}^A(Pj)$ for $j \in \{1, 2, \ldots, m\}$. The roundness factor $N^r(Pj)$ of polygon Pj is calculated as $4\pi$ divided by the sum of the lengths of each side of Pj. Average roundness factor $\mathcal{N}^r$ and disorder $D^r$ are computed similar to $\hat{N}^A$ and $D^A$.

Delaunay Triangulation

The Delaunay graph D is constructed such that any two unique nuclear centroids $c^a_n$ and $c^b_n$, where $a, b \in \{1, 2, \ldots, m\}$, are connected by an edge $E^{a,b}$ if Pa and Pb share a side in V. The following features are computed from D. The average edge length $\hat{E}$ and the maximum edge length $E^{max}$ are computed over all edges in D. Each $c^a_n$ is connected to B other nuclear centroids $c_n^{a,\alpha 1}, c_n^{a,\alpha 2}, \ldots, c_n^{a,\alpha B}$ by corresponding edges $E^{a,\alpha 1}, E^{a,\alpha 2}, \ldots, E^{a,\alpha_B}$ in D, where $a1, a2, \ldots, aB \in \{1, 2, \ldots, m\}$. The average length of the edges $E^{a,\alpha 1}, E^{a,\alpha 2}, \ldots E^{a,\alpha_B}$ is calculated for each $a \in \{1, 2, \ldots, m\}$ Minimum Spanning Tree Given a connected, undirected graph, a spanning tree S of that graph is a subgraph which is a tree and connects all the vertices together. A single graph can have many different S. Weights $\omega_S^E$ are assigned to each edge E in each S based on the length of E in S. The sum of all weights $\omega_S^E$ in each S is determined to give the weight $\hat{\omega}_S$ assigned to each S. The minimum spanning tree (MST) denoted by $S^M$ has a weight $\hat{\omega}_S^M$ less than or equal to $\hat{\omega}_S$ for every other spanning tree S. The features computed from $S^M$ are (i) average length of all edges in $S^M$ and (ii) edge length disorder computed as for $D^A$ and $D^r$.

Co-Adjacency Matrix

To describe the arrangement of glands in the image, a co-adjacency matrix W is constructed where for the value of row u, column v, $W(u, v) = \|c^u_g - c^v_g\|$, $u, v \in \{1, 2, \ldots, k\}$, and $W \in \mathcal{R}^{k \times k}$. This diagonally symmetric matrix describes the spatial relationships between each pair of glands in R analogous to the manner in which Haralick's co-occurrence matrix describes the relationship between pixel intensity values. 13 of Haralick's second-order features were calculated from W: angular second moment, contrast, correlation, variance, entropy, sum average, sum variance, sum entropy, difference variance, difference entropy, difference moment, and two measurements of correlation.

Nuclear Density and Gland Morphology

Nuclear density $\Pi^D$ is computed as $\Pi^D = m/|R|$, where $|R|$ is the cardinality of R. For each nuclear centroid $c^a_n$, $N(\mu, c^a_n)$ is the set of pixels $c \in R$ contained within a circle with its center at $c^a_n$ and radius $\mu$. The number of $c^j_n$, $j \neq a$, $a \in \{1, 2, \ldots, m\}$ were computed, which are in set $N(\mu, c^a_n)$. The disorder of this feature $D^N$ is calculated as described A. The size and shape of the structures within a set of glands are also important in discriminating tissue type. These characteristics are quantified by calculating the average and standard deviation of the following 8 features within an image: total gland area, gland perimeter length, lumen area, ratio of lumen area to gland area, ratio of gland area to perimeter, number of nuclei surrounding the lumen, ratio of nuclei to gland perimeter, and the number of visible nuclei layers around the gland. In addition, calculation is made for the total area of non-stromal tissue in the image, the total lumen area in the image, and the ratio of these two values to measure the amount of the total region area that was taken up by gland structures. These bring the total number of tissue-based architectural features to 45.

Global Texture Features

The proliferation of nuclei and changes in gland morphology in cancerous tissue suggest that textural characteristics can distinguish between low- and high-grade cancer regions. The following features are extracted from each region:

First-Order Statistical Features—The average, median, standard deviation, and range of the pixel values f(c), for $c \in R$, are calculated to quantify first-order statistics.

Second-Order Statistical Features—Second-order co-occurrence texture features are described by the 13 Haralick features described above, using a co-occurrence matrix $Z \in \mathcal{R}^{M \times M}$, where M is the maximum pixel intensity of all $c \in R$, in place of the co-adjacency matrix. The value in Z(f(c), f(d)) is given by the number of times intensities f(c), f(d) appear within a fixed displacement of each other and at a specified orientation. The 13 Haralick features are calculated from Z.

Steerable Filters—Gabor filters provide varying responses to textural differences in an image. The filter kernel G is constructed based on a scale and an orientation parameters as:

$$G(x, y, \theta, s) = e^{-\frac{1}{2}\left(\left(\frac{x'}{\sigma_x}\right)^2 + \left(\frac{y'}{\sigma_y}\right)^2\right)} \cos(2\pi x')$$

where (x, y) are the 2D Cartesian coordinates for pixel $c \in R$, $x' = x \cos \theta + t \sin \theta$, $y' = y \cos \theta + x \sin \theta$, $q \in \{0, \pi/8, \ldots, 7\pi/8\}$ is an orientation parameter, $s \in \{0, 1, \ldots, 4\}$ is a scale parameter, and $\sigma x$ and $\sigma y$ are the standard deviations along the X and Y axes, respectively. Here, 40 Gabor filters are constructed by varying $\theta$ and $\sigma$. Thus a total of 57 texture-based features are obtained for each R.

Classification

An SVM uses the above features to discriminate between each pair of tissue types used in this Example: Gleason grade 3 vs. grade 4, grade 3 vs. benign epithelium, grade 3 vs. benign stroma, grade 4 vs. benign epithelium, grade 4 vs. benign stroma, and benign epithelium vs. benign stroma. A third of the data from each group was used for training the classifier and the rest was used for testing. Since SVMs perform classification in a high-dimensional space, local linear embedding (LLE) was applied to reduce the dimensionality of the feature space prior to classification. Cross-validation was used to obtain optimal parameters for the classifier.

Results

Phenotypic signatures for 54 regions consisting of 11 of Gleason grade 3 tissue, 7 of Gleason grade 4, 17 of benign epithelium, and 12 of benign stroma were generated. Table 2 lists classification results for each paired comparison of the four classes.

TABLE 2

SVM classification accuracy, standard deviation, and the feature assigned the highest weight by the AdaBoost algorithm.

| Class Distinction | Accuracy | σ | Highest Weighted Feature |
|---|---|---|---|
| Grade 3 vs. Grade 4 | 76.9% | 0.049 | Delaunay Nearest Neighbor |
| Grade 3 vs. Epithelium | 85.4% | 0.051 | Haralick Difference Variance |
| Grade 3 vs. Stroma | 92.8% | 0.026 | MST Average Edge Length |
| Grade 4 vs. Epithelium | 88.9% | 0.025 | Haralick Variance |
| Grade 4 vs. Stroma | 89.7% | 0.040 | Voronoi Nearest Neighbor |
| Epithelium vs. Stroma | 92.4% | 0.017 | Haralick Difference Moment |

Figure 9A:
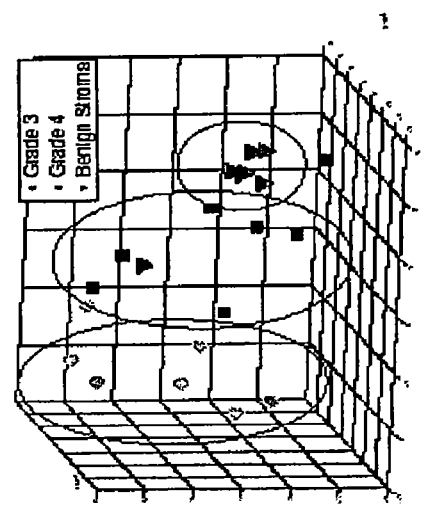
FIG. 9 shows scatter plots of tissue regions represented in reduced three dimensional space. Tissue regions belong to (a) Gleason grade 3 (circles), Gleason grade 4 (squares) and benign stromal tissue (downward-pointing triangles) are distinguished by textural and graph-based features, and (b) Gleason grades 3 and 4 with benign epithelium (upward-pointing triangles) are distinguished by textural and graph-based features. Also shown are the subset of tissue regions containing glandular features distinguished by graph-based, textural, and glandular morphological features (c). Superimposed ellipses indicate the clusters of similar tissue types.
Figure 9:
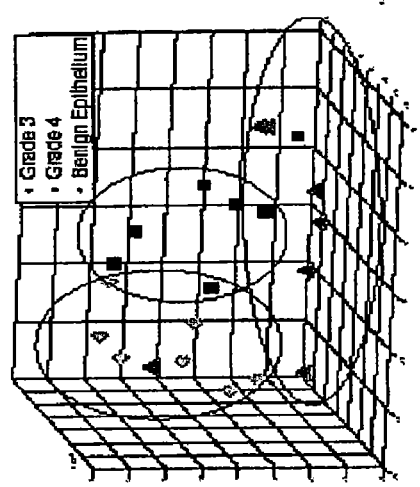
Figure 9:
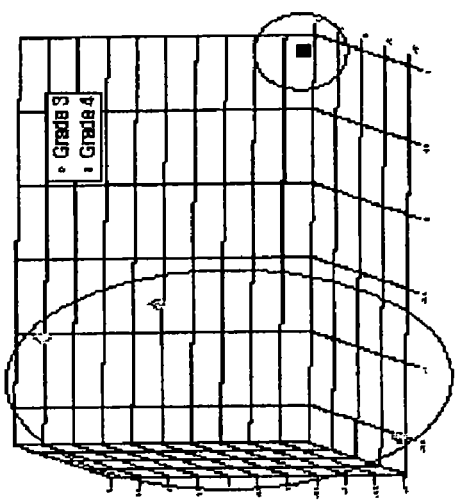

The accuracy and standard deviation σ over six trials are given for each classification task, where the training data is randomized for each trial. Automated classification yields approximately 77% accuracy when comparing between Gleason grade 3 and grade 4 adenocarcinoma, which is clinically a very difficult problem. Studies on agreement and reproducibility in clinical practice show that consensus grading among pathologists rarely approaches 70%, and agreement on a Gleason score of 4 or 3 is particularly low. In this context, classification accuracy greater than 75% is an improvement on existing grading methods. The standard deviation for all paired comparisons is less than or equal to 0.05, indicating the reproducibility of the classification results with respect to training data. FIG. 9 plots each tissue region in a low-dimensional space obtained by LLE.

In FIG. 9 (a) Gleason grade 3 (circles), grade 4 (squares), and benign stroma (downward triangles) are shown, and FIG. 9 (b) shows grade 3 and grade 4 regions along with benign epithelium (upward triangles). The graphs illustrate the interclass relationships between the data using this feature set. Because not all tissue regions contain glands, only graph-based and textural features were used to generate the graphs in FIGS. 9 (a) and (b). FIG. 9 (c) plots the tissue regions for which morphological gland features could be calculated. The separation between grade 3 and grade 4 tissues improves with the inclusion of these features, indicating that their addition to the classifier improves accuracy.

Implicit feature selection via the AdaBoost algorithm revealed that texture features are weighted heavily, particularly in discriminating the adenocarcinoma tissues from benign epithelium and in discriminating epithelium from stroma.

Example 3

Grading of Breast Cancer Using CBIR

Computerized Feature Extraction to Develop Quantitative Signatures for Breast Cancer Grades Breast tissue samples are scanned into the computer at 40× optical magnification using a whole-slide digital scanner, where they are deconstructed into constituent scales. The grading of breast tissue is done across multiple magnifications. At lower magnifications only textural attributes and, overall features of tissue architecture including tubule formation are apparent, while at higher magnifications nuclear and other cellular cytological details become visible. Texture features include 13 Haralick texture features, along with several first-order statistical texture features. Also extracted is a series of steerable Gabor filter features, which provide a varying filter response to textural differences at a series of scales and orientations. FIGS. 10(b)-(e), and 10(g)-(j) represent the corresponding texture feature representations (Gabor, Sobel, Gradient Magnitude) of the low- (10(a)) and high-grade (10 (f)) breast cancers. Cellular architecture and morphology features which are visible at higher magnifications is extracted at 20× and 40× magnifications and include total normalized gland area, gland perimeter, lumen area, lumen-to-gland area ratio, gland area-to-perimeter ratio, number of nuclei surrounding the lumen, ratio of nuclei to gland perimeter, number of visible nuclei layers around the gland, radial gradient index, and fractal dimension of the boundary. Robust color segmentation schemes and level sets and geodesic active contour models are used to extract the center and boundary of nuclei and ducts (glands). The architectural arrangement of nuclei within each cancer grade is described via the Voronoi diagram and it's associated sub-graphs: the Delaunay triangulation, and the minimum spanning tree. From each of these three graphs, a series of features is calculated that captures the size, shape, and arrangement of the structures of the nuclei.

Training and Evaluation of the CAD Model for Breast Histology Grading

Figure 11A:
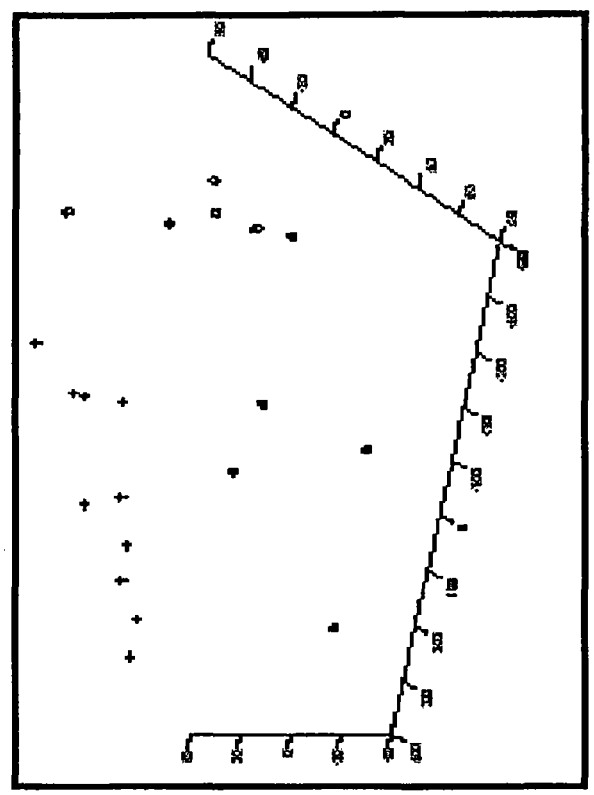
FIG. 11 shows (a) Isomap embedding, and corresponding (b) Locally linear embedding scatter plots showing separation between high grade (+) and low grade breast cancer (o), obtained via use of over 100 textural image features.
Figure 11B:
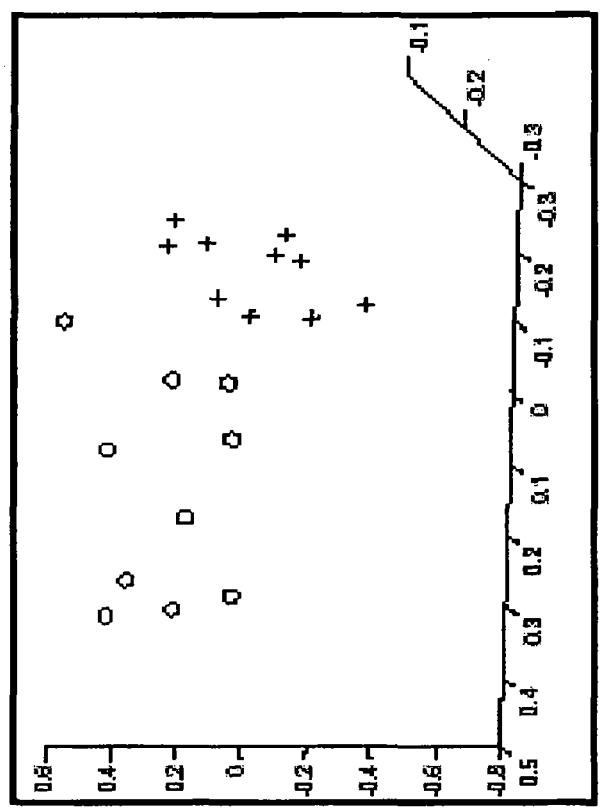
Figure 12:
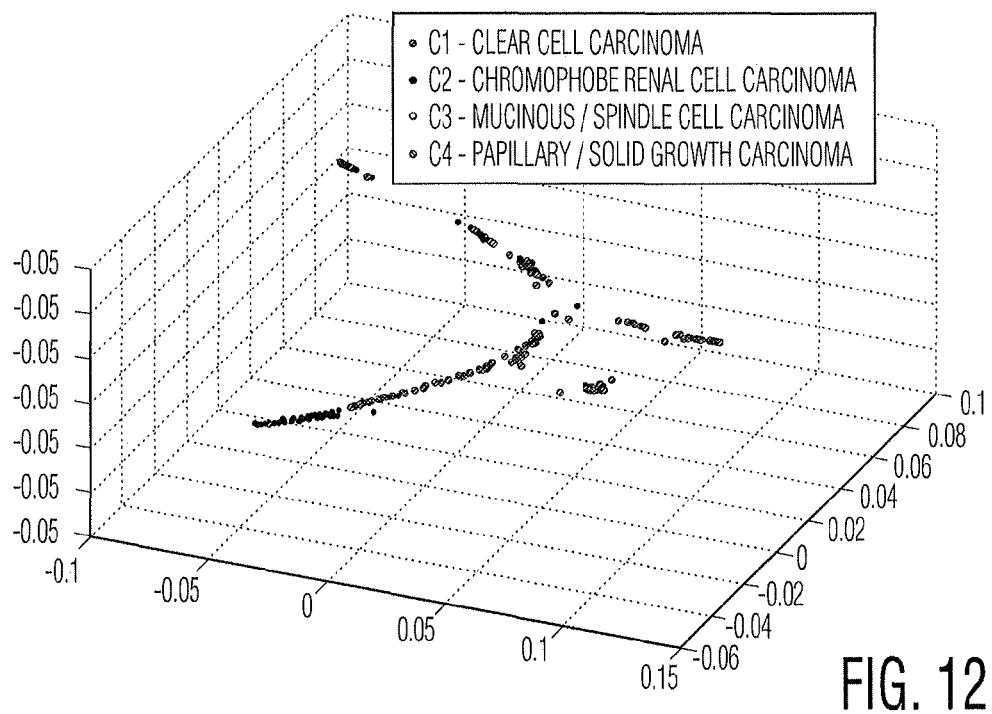
FIG. 12 shows Clear Cell Carcinoma (Green) vs. Chromophobe Renal Cell Carcinoma (Blue), reduced using Laplacian Eigenmaps.
Figure 13:
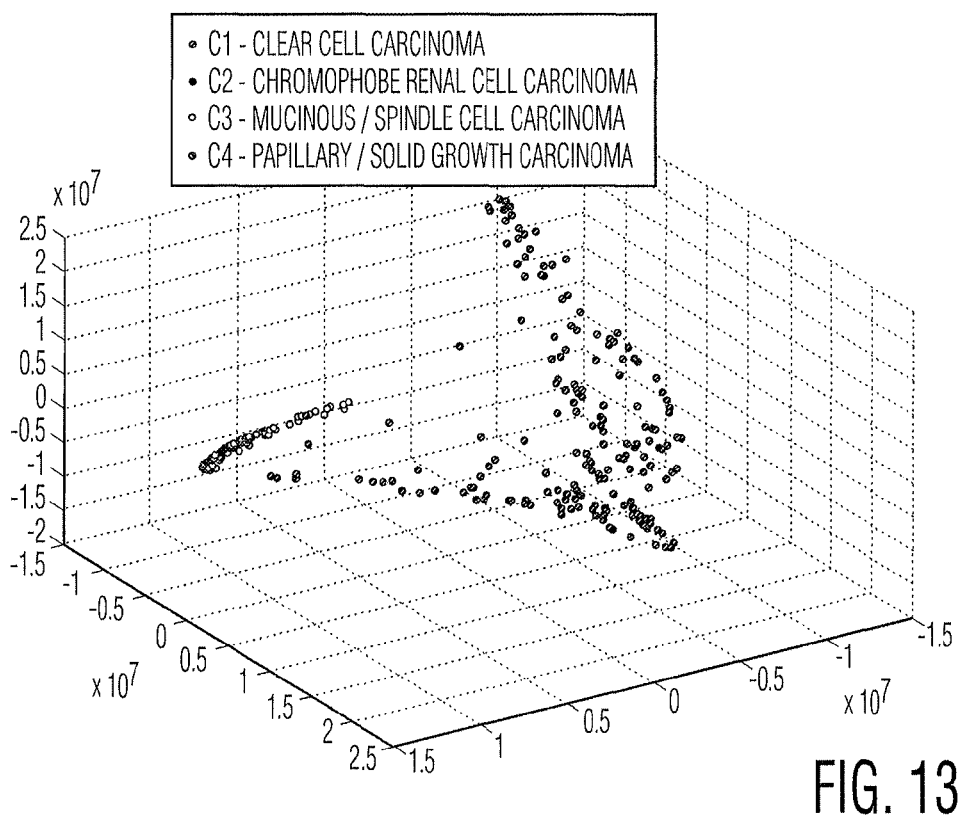
FIG. 13 shows Clear Cell Carcinoma (Green) vs. Mucinous/Spindle Cell Carcinoma (Yellow), reduced using Graph Embedding.
Figure 14:
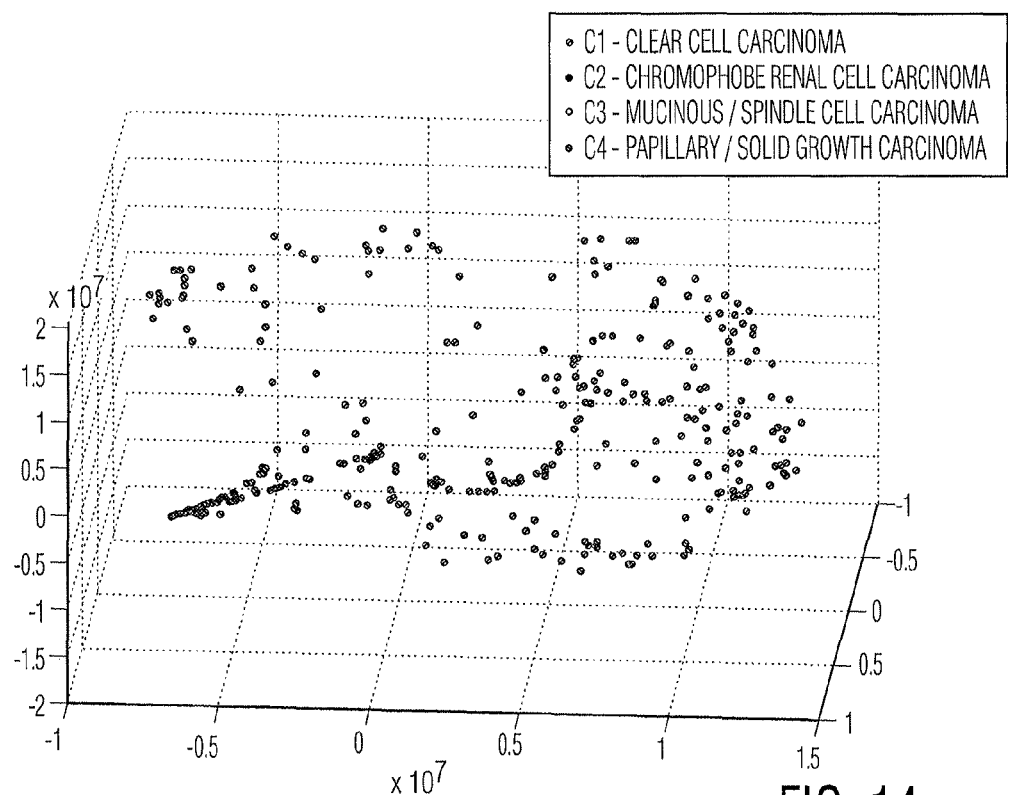
FIG. 14 shows Clear cell carcinoma (Green) vs. Papillary/Solid Growth Carcinoma (Red), reduced using Graph Embedding.
Figure 15:
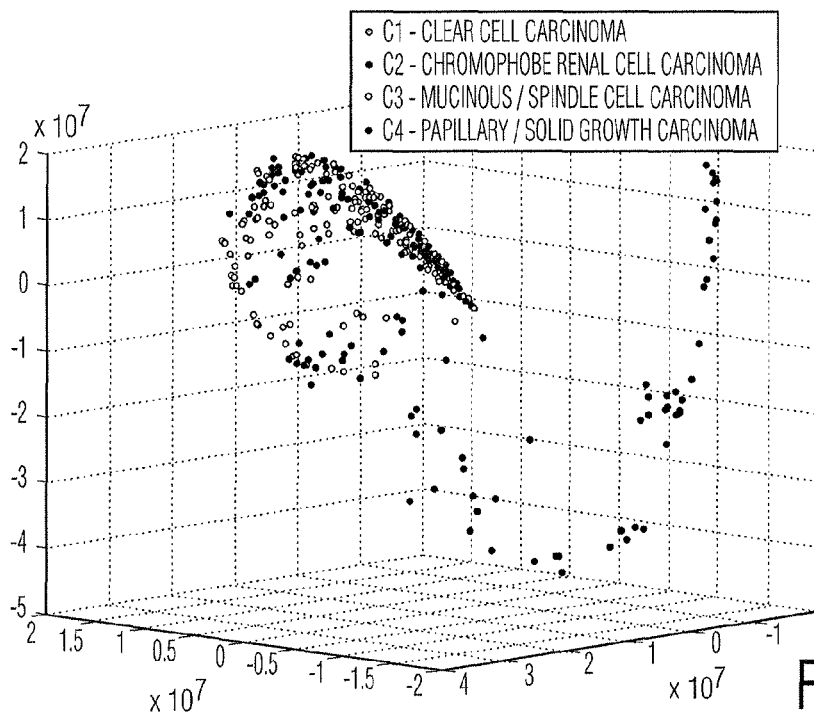
FIG. 15 shows Chromophobe Renal Cell Carcinoma (Yellow) vs. Mucinous/Spindle Cell Carcinoma (Blue), reduced using Graph Embedding.
Figure 16:
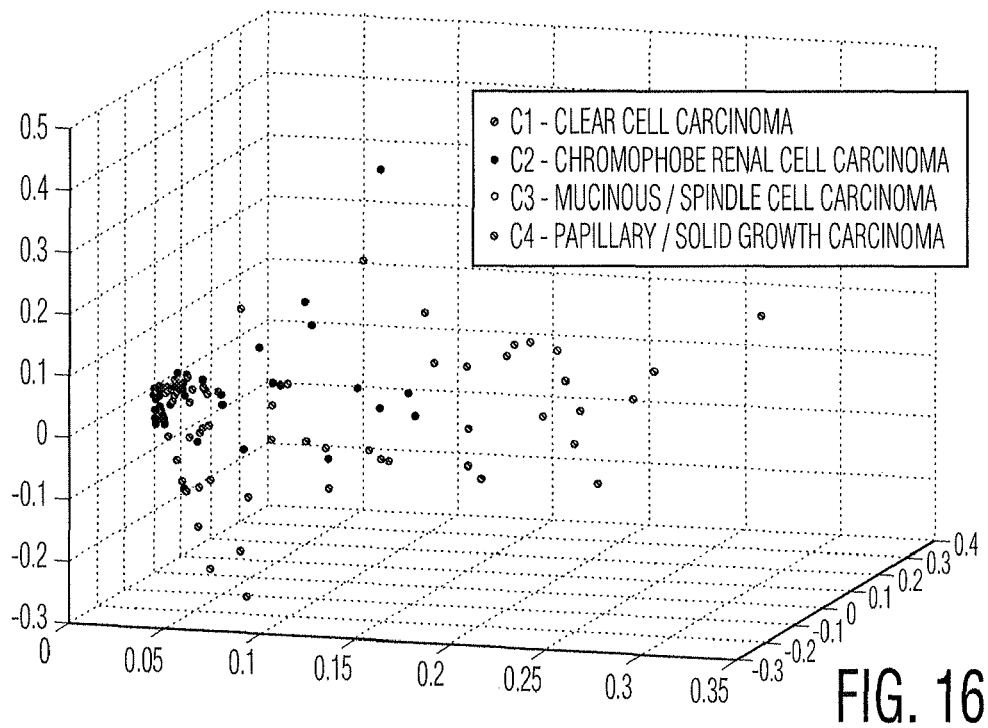
FIG. 16 shows Chromophobe Renal Cell Carcinoma (Blue) vs. Papillary/Solid Growth Carcinoma (Red), reduced using Principal Component Analysis.
Figure 17:
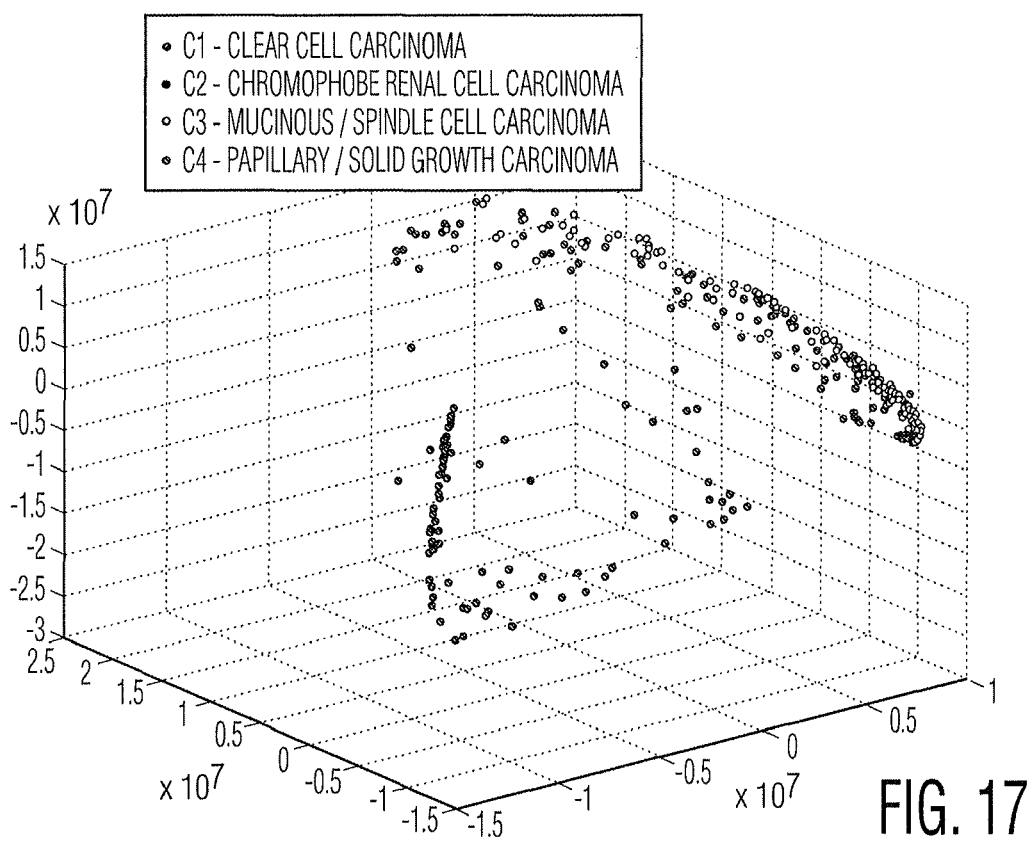
FIG. 17 shows Mucinous/Spindle Cell Carcinoma (Yellow) vs. Papillary/Solid Growth Carcinoma (Red), reduced using Graph Embedding.

Roughly 100 patient studies in set S1 comprising low-, intermediate-, and high-grade cancers (roughly equal number of studies for each grade) are used for training of the histological CAD model and in learning model parameters. In order to ensure against over-training a randomized cross-validation model (Jörnsten et al., 2003) is used to train the model. Algorithms were found to be able to accurately distinguish between 10 low-grade and 10 high-grade breast cancers (FIG. 11). Consequently the size of the database considered here (100) should be sufficient to statistically significantly distinguish between the 3 cancer grades via the described techniques.

Following feature extraction each breast histology image is represented by a high (>500) dimensional attribute vector Vp. Non-linear dimensionality reduction techniques are then applied to Vp to reduce the data dimensionality and a multiple classifier system is used to distinguish between the various objects in the lower dimensional space. Feature selection methods via AdaBoost, and Forward and Backward selection) is used to identify the most discriminatory features for each cancer grade.

Evaluation of the CAD Model is Done on Approximately 150 Independent Studies in Test Sets S2, S3

Comparisons is performed between multiple classifier ensembles including Boosting, Bagging, Decision Trees, Support Vector machines, k-NN, and Bayesian learners to determine the optimal classifier in terms of accuracy, efficiency, model stability, reproducibility and ease of training. FIG. 11 shows how our CAD methods distinguish between high and low grade tumors.

Example 4

Classifying Renal Cancer Using CBIR

Images of renal cell carcinomas are decomposed using pyramidal decomposition into their constituent scales. The images are grouped into four image classes, based on the pathology the image represents:

At the lowest scale (i.e. smallest image), the set of features comprising Gabor filter features, Greylevel statistical features, and Haralick co-occurrence features are extracted from each of the 3 color channels and at three different window sizes, generating a set of feature scenes.

The pixels from images corresponding to each class are grouped together (i.e. all features from pixels in Class 1 are grouped together, those from Class 2 are grouped, etc). From each class, 200 pixels are randomly sampled (for computational efficiency).

The pixels corresponding to two different classes are run through the manifold learning algorithm, and are reduced to three dimensions. The resulting 3-dimensional points are plotted on a scatter plot. In this way, each plot shows the class relationships between 200 points from each of two classes. The results are shown in FIGS. 12-17.

All manifold learning algorithms were performed on the data and the results that most clearly demonstrate the ability of the features to discriminate between each pair of cancer classes selected. A clear separation between classes is evident in nearly all cases. In most cases, graph embedding provided the best separation.

The classes are indicated by their color on the scatter plot and are indicated by the legends in the plots.

Having described preferred embodiments of the invention with reference to the accompanying drawings, it is to be understood that the invention is not limited to the precise embodiments, and that various changes and modifications may be effected therein by those skilled in the art without departing from the scope or spirit of the invention as defined in the appended claims.

What is claimed is:

1. A computer-aided diagnostic method to predict a probability that a histological image contains a malignant region comprising:

a. obtaining said histological image, wherein the histological image is a first of a series of further histological images ordered in increasing magnification;
b. identifying a region or regions of said histological image classified as suspect;
c. extracting one or more image features from at least one of said identified region or regions;
d. reducing a dimensionality of said extracted feature image features; and
e. classifying said identified region or regions as either benign, malignant, or suspect based on at least one of said extracted image features, wherein if said identified region or regions are classified as malignant, the histological image has a malignant region, otherwise;
   i. if the identified region or regions are classified as benign, then the histological image does not have a malignant region; or
   ii. if the identified region or regions are classified as suspect, a next histological image in the series is obtained and the steps of identifying, extracting, reducing and classifying are repeated.

2. The method of claim 1, wherein said series of images are generated by a pyramidal decomposition.

3. The method of claim 1, wherein said image feature is a statistical feature, a Haralick co-occurrence feature, a Haar wavelet feature, or a Gabor feature, wherein said image feature is calculated independently from each channel of the respective image using a sliding window of 3×3, 5×5, or 7×7 pixels.

4. The method of claim 3, wherein said statistical feature is an average, a median, a standard deviation, a difference, a Sobel filter, a Kirsch filter, a horizontal derivative, a vertical derivative, or a diagonal derivative of a pre-selected determinant.

5. The method of claim 3, wherein said Haralick co-occurrence feature is an angular second moment, a contrast, a correlation, a variance, an entropy, an inverse difference moment, a sum average, a sum variance, a sum entropy, a difference variance, or a difference entropy.

6. The method of claim 3, wherein said Haar wavelet feature is a result of a convolution of said respective image with a Haar wavelet kernel.

7. The method of claim 3, wherein said Gabor feature is a result of convolving said respective image with a bank of Gabor filters, generated by convolving a Gaussian function with a sinusoid at a range of scale and orientation parameter values.

8. The method of claim 1, wherein the step of reducing the dimensionality is done by using a principal component analysis, a linear dimensional analysis, a multidimensional scaling, a graph embedding, an ISOMAP, a local linear embedding, a kernel-based principal component analysis, a semidefinite embedding, Laplacian eigenmaps, or a combination thereof.

9. The method of claim 1, wherein said step of classifying further comprises the steps of:
a. creating a likelihood scene for a selected image of the series of images;
b. creating a mask identifying regions of said selected image as benign or suspect by thresholding said likelihood scene at a value determined through system training; and
c. classifying said identified region or regions as either benign, malignant, or suspect based on said mask, wherein if the identified region or regions are classified as suspect, said mask is resized by interpolation to a size of a subsequent image in the series to identify suspect regions on said subsequent image.

10. The method of claim 9 wherein said likelihood scene is determined by: a Decision Tree algorithm, a Support Vector Machine algorithm, an Adaboost algorithm using Bayes Decision Theorem, or at least one image feature extracted from one or more training images.

11. A method for histopathological analysis of a gland tissue sample, comprising:
a. selecting an image of the gland tissue sample, wherein said image comprises regions classified by the methods of claim 9 as malignant, benign or suspect;
b. identifying regions of said selected image classified as suspect;
c. extracting at least one image feature from at least one of said identified regions;
d. reducing the dimensionality of said at least one extracted image feature; and
e. classifying said identified regions as one of the group consisting of a cancerous tissue of a specific clinical stage of malignancy, a benign epithelium, and a benign stroma based on said at least one extracted image feature.

12. The method of claim 11, wherein said at least one image feature is at least one of the group consisting of an architectural feature, a nuclear density feature, a gland morphology feature, and a global texture feature.

13. The method of claim 12, wherein said architectural feature is selected from the group of features calculated from a Voronoi diagram, a Delaunay graph, and a minimum spanning tree constructed from nuclei centers in the image, and a co-adjacency matrix constructed from the gland centers in the image.

14. The method of claim 13, wherein said architectural feature computed from the Voronoi diagram is a standard deviation, an average, a ratio of minimum to maximum, or a disorder of areas, perimeters, or chords of polygons in the Voronoi diagram of said image.

15. The method of claim 13, wherein said architectural feature computed from the Delaunay graph is a standard deviation, an average, a ratio of minimum to maximum, or a disorder of side lengths or areas of triangles in the Delaunay graph of said image.

16. The method of claim 13, wherein said architectural feature computed from the minimum spanning tree is a standard deviation, an average, a ratio of minimum to maximum, or a disorder of edge lengths in the minimum spanning tree of said image.

17. The method of claim 13, wherein said co-adjacency matrix constructed from the gland centers in said image is used to calculate an angular second moment, a contrast, a correlation, a variance, an entropy, an inverse difference moment, a sum average, a sum variance, a sum entropy, a difference variance, or a difference entropy.

18. The method of claim 12, wherein said nuclear density feature is a number or density of nuclei in said image; an average, a standard deviation, or a disorder of distances from each of the nuclei in said image to 3, 5, or 7 nearest neighboring nuclei; or the average, the standard deviation, or the disorder of the number of neighboring nuclei within a circle with a radius of 10, 20, 30, 40, or 50 pixels centered on each nucleus within said image.

19. The method of claim 12, wherein said gland morphology feature is calculated from a boundary of either a gland lumen or an interior nuclei as a ratio of a gland area to an area of a smallest circle that circumscribes a gland of the image; a standard deviation, a variance, or a ratio of a maximum to an average distance between a gland center and a boundary; a ratio of an estimated boundary length (the boundary calculated using a fraction of the boundary pixels) to an actual boundary length; a ratio of a boundary length to an area enclosed by the boundary; and a sum of a difference between a distance from the gland center to the boundary and an average of the distances from the gland center to two adjacent points.

20. The method of claim 12, wherein said global texture feature is an average, a median, a standard deviation, a range, an angular second moment, a contrast, a correlation, a variance, an entropy, a sum average, a sum variance, a sum entropy, a difference variance, a difference entropy, a difference moment, or a Gabor filter.

21. The method of claim 11, wherein the dimensionality of the at least one extracted image feature is reduced through use of principal component analysis, linear dimensional analysis, multidimensional scaling, graph embedding, ISOMAP, local linear embedding, kernel-based principal component analysis, semidefinite embedding, or Laplacian eigenmaps.

22. The method of claim 11, wherein said step of classification is performed by: a Support Vector Machine algorithm, a Decision Tree algorithm, an Adaboost algorithm using Bayes Decision Theorem or combination thereof.

23. A system for predicting a probability that a histological image contains a malignant region, the system comprising:
   a database for storing a series of further histological images ordered in increasing magnification, the histological image being a first image in the series of further histological images;
   means for identifying a region or regions of said histological image classified as suspect;
   a feature extraction module for extracting one or more image features from at least one of said identified region or regions;
   a manifold learning module for reducing a dimensionality of said extracted image features; and
   means for classifying said identified region or regions as either benign, malignant, or suspect based on at least one of said extracted image features,
   wherein if said identified region or regions are classified as malignant, the histological image has a malignant region, otherwise,
      i. if the identified region or regions are classified as benign, then the histological image does not have a malignant region; or
      ii. if the identified region or regions are classified as suspect, a next histological image in the series is obtained, the next histological image being processed via the means for identifying, the feature extraction module, the manifold learning module and the means for classifying to classify at least one region of the next histological image as benign, malignant or suspect.

24. The method of claim 1, wherein the histological image is of a prostate.

25. The method of claim 11, wherein the gland tissue sample is of a prostate.

* * * * *